US006996321B2

(12) United States Patent
Sasaura et al.

(10) Patent No.: US 6,996,321 B2
(45) Date of Patent: Feb. 7, 2006

(54) OPTICAL WAVEGUIDE AND METHOD OF MANUFACTURE

(75) Inventors: Masahiro Sasaura, Hitachinaka (JP); Kazuo Fujiura, Mito (JP); Koji Enbutsu, Mito (JP); Tadayuki Imai, Mito (JP); Shogo Yagi, Mito (JP); Takashi Kurihara, Mito (JP); Makoto Abe, Mito (JP); Seiji Toyoda, Toukai-mura (JP); Eishi Kubota, Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 11 days.

(21) Appl. No.: 10/909,433

(22) Filed: Aug. 3, 2004

(65) Prior Publication Data

US 2005/0008318 A1    Jan. 13, 2005

Related U.S. Application Data

(62) Division of application No. 10/142,964, filed on May 13, 2002, now Pat. No. 6,792,189.

(30) Foreign Application Priority Data

| May 14, 2001 | (JP) | ............................. 2001-143570 |
| May 14, 2001 | (JP) | ............................. 2001-143571 |
| May 16, 2001 | (JP) | ............................. 2001-146560 |
| May 31, 2001 | (JP) | ............................. 2001-165283 |

(51) Int. Cl.
*G02B 6/00* (2006.01)
*G02B 6/10* (2006.01)

(52) U.S. Cl. ...................... 385/132; 385/129; 385/130; 385/131; 385/142; 385/144; 65/386; 29/600; 117/918; 117/948

(58) Field of Classification Search ........ 385/129–132, 385/141–143; 29/600; 117/918, 948; 65/386
See application file for complete search history.

(56) References Cited

U.S. PATENT DOCUMENTS

| 4,737,015 A |   | 4/1988 | Ishida et al. ................. 385/142 |
| 5,180,470 A | * | 1/1993 | Smith et al. ................... 117/58 |
| 5,295,218 A |   | 3/1994 | Agostinelli et al. ......... 385/122 |

(Continued)

FOREIGN PATENT DOCUMENTS

EP    0 460 726    12/1991

(Continued)

OTHER PUBLICATIONS

Fluck, D et al., "Optical Waveguides In KTA1-XNBX03 Produced by He Ion Implantation", Journal of Applied Physics, American Institute of Physics, New York, vol. 70, No. 9, Nov. 1, 1991, pp. 5147-5149.

(Continued)

*Primary Examiner*—Akm Enayet Ullah
*Assistant Examiner*—Daniel Petkovsek
(74) *Attorney, Agent, or Firm*—Marina V. Schneller; Venable LLP

(57) ABSTRACT

An optical waveguide capable of having various characteristics and a method of manufacture thereof as well as a method of manufacturing a crystal film are provided. An optical functional material $KTa_xNb_{1-x}O_3$ is used as an optical waveguide. The input optical signal is transmitted to the $KTa_xNb_{1-x}O_3$ film. The $KTa_xNb_{1-x}O_3$ film undergoes changes in optical property when an external voltage signal is applied to the electrode. Therefore, as it passes through the $KTa_xNb_{1-x}O_3$ film, the input optical signal is modulated by the characteristic change. The modulated optical signal is taken out as an output optical signal.

5 Claims, 16 Drawing Sheets

U.S. PATENT DOCUMENTS

| | | | | |
|---|---|---|---|---|
| 5,476,720 | A | 12/1995 | Gunter et al. | 428/471 |
| 5,581,396 | A | 12/1996 | Kubota et al. | 359/322 |
| 5,614,129 | A | 3/1997 | Hofmeister et al. | 252/584 |
| 5,763,055 | A * | 6/1998 | Kawaguchi et al. | 428/195.1 |
| 5,824,419 | A | 10/1998 | Kawai et al. | 428/432 |
| 5,852,703 | A | 12/1998 | Nashimoto et al. | 385/130 |
| 6,069,394 | A * | 5/2000 | Hashimoto et al. | 257/466 |
| 6,307,996 | B1 | 10/2001 | Nashimoto et al. | 385/130 |
| 6,353,495 | B1 | 3/2002 | Mizuuchi et al. | 359/326 |
| 6,447,606 | B2 | 9/2002 | Imaeda | 117/108 |
| 6,513,226 | B2 | 2/2003 | Iwai et al. | 29/600 |

FOREIGN PATENT DOCUMENTS

| | | |
|---|---|---|
| EP | 0 737 884 | 10/1996 |
| JP | 11194223 | 7/1999 |
| WO | WO 92/14176 | 8/1992 |

OTHER PUBLICATIONS

Gutmann, R. et al., "Auger Electron and X-Ray Photoelectron Spectroscopy of Monocrystalline Layers Of KTA1-xNbx03 Grown By Liquid-Phase Epitaxy", Journal of Applied Physics, vol. 70, No. 5, Sep. 1, 1991 (pp. 2648-2653).

Hulliger, Jr. et al., "Growth of Large Size KNB03 Crystals and Epitaxial Layers of KTA1-XNBX03", Journal of Crystal Growth, North Holland Publishing Co., vol. 128, No. PT 2 1/4, Mar. 1, 1993 (pp. 897-902).

Hu, P. F. et al., Fabrication and Characterization of Optical Waveguides in Potassium Lithium Niobate (KLN) Substrates, Data Storage Unit, National University of Singapore, Pacific Rim '99.

Tatau Nishinaga et al., "Crystal Growth Aspect of High-Te Superconductors", Graduate School of Engineering, University of Tokyo, Crystal Growth Group, Swiss Federal Institute of Technology, CH-1007, Lausanne, Switzerland.

Patent Abstracts of Japan, vol. 1999, No. 12, Oct. 29, 1999.

*Onoe Atsushi et al.*, Epitaxial growth of orientation-controlled KNb03 crystal films of MgO using KtaxNb1-x03 intermediate layer by metalorganic chemical vapor deposition.

* cited by examiner

OPTICAL WAVEGUIDE AND METHOD OF MANUFACTURE

This application is a divisional of U.S. Pat. No. 6,792,189 B2, which issued on U.S. patent application Ser. No. 10/142,964 filed May 13, 2002, which is relied upon under 35 U.S.C. 120 and is incorporated by reference herein; said U.S. patent application Ser. No. 10/142,964, in turn, relies upon, and claimed the benefit of, Japanese Patent Application Nos. 2001-143570 filed May 14, 2001, 2001-143571 filed May 14, 2001, 2001-146560 filed May 16, 2001 and 2001-165283 filed May 31, 2001, the contents of each of which are incorporated herein by reference and the benefit of which is claimed under 35 U.S.C. 119.

BACKGROUND OF THE INVENTION

1. Field of the Invention

The present invention relates to an optical waveguide and a method of manufacture thereof and more particularly to an optical waveguide for novel functional optical integrated circuits using an optical functional material $KTa_xNb_{1-x}O_3$ as the optical waveguide and a method of manufacture thereof and also to a method of manufacturing a crystal film for use with optical communication devices.

2. Description of the Related Art

Intensive research and development efforts are being made from a cost performance point of view to develop optical integrated circuits that integrate on a single substrate optical devices that perform emission, detection, modulation, and multiplexing and demultiplexing of light. This integration technology is expected to reduce electric power, enhance performance and reduce cost of these optical devices.

Conventional optical integrated circuits currently in wide use have a fabrication in which a waveguide structure is formed on a semiconductor substrate using $SiO_2$ and polymers to process an optical signal launched from outside. The waveguide structure refers to a structure comprising an undercladding layer, a waveguide layer formed on the undercladding layer and having a refractive index higher than that of the undercladding layer, and an overcladding layer covering the waveguide layer and having a refractive index smaller than that of the waveguide layer. To realize a function of optical signal processing, the conventional optical ICs change an optical properties of the waveguide material as represented by ordinary and extraordinary refractive indices by applying external fields, such as heat, electric fields, magnetic fields and sound, thereby achieving such functions as multiplexing/demultiplexing optical signals and adjusting a transfer time.

However, since the waveguide materials currently available are limited to $SiO_2$, polymers, semiconductors and a small range of nonlinear crystals, the changing of the optical properties as realized by the method described above is greatly restricted by the characteristic of the waveguide material used, thus imposing limitations on the applicable optical signal processing.

Under these circumstances, the use of a novel waveguide material $KTa_xNb_{1-x}O_3$ is being considered. The optical functional material $KTa_xNb_{1-x}O_3$ exhibits an optical second-order nonlinear effect. An optical nonlinear constant of this material is 1,200–8,000 pm/V, significantly larger than 31 pm/V which is an optical nonlinear constant of $LiNbO_3$ for example.

Further, since this optical nonlinear effect is attributed to the displacement of positions of constitutional elements by the application of an electric field, the presence or absence of the optical nonlinear effect can be controlled by the application of an electric field.

The material $KTa_xNb_{1-x}O_3$ undergoes a ferroelectric phase transition at a composition-dependent Curie temperature of between −250° C. and 400° C. At this Curie temperature as a boundary the material's property changes significantly. For example, its dielectric constant greatly changes from approximately 3,000 to about 20,000. It is possible to create a new optical integrated circuit taking advantage of the ferroelectric phase transition. The Curie temperature varies depending on the composition x of $KTa_xNb_{1-x}O_3$, and adding Li to $KTa_xNb_{1-x}O_3$ to produce $K_yLi_{1-y}Ta_xNb_{1-x}O_3$ makes it possible to adjust the temperature range.

The fabrication process of an optical waveguide requires steps of first forming a waveguide material film and then performing patterning and etching on the film using photolithography or the like.

The currently used waveguide materials, however, are limited to $SiO_2$, polymers, semiconductors and a small range of nonlinear crystals. Hence, the modification of optical properties as realized by the aforementioned application of heat, electric fields, magnetic fields or sound is greatly restricted by the characteristics of the waveguide material used. The conventional optical ICs therefore have a problem that the applicable range of optical signal processing is very narrow.

Further, the method of manufacturing an optical waveguide using the $KTa_xNb_{1-x}O_3$ optical functional material described above also requires the fabrication process, similar to the conventional one, of forming a film of the waveguide material and patterning the waveguide film by photolithography. Therefore, even in using the novel waveguide material $KTa_xNb_{1-x}O_3$, the conventional technology has a problem that the waveguide fabrication process is complex.

Another problem is that, although the waveguide fabrication is essential in obtaining a desired performance, a technique to form waveguides in a KTN crystal has not yet been established. This is attributed to the fact that ions that increase the refractive index and still do not degrade the nonlinear characteristic after diffusion has not been found.

The chemical vapor deposition (CVD) method vaporizes a material containing constitutional components and causes a desired reaction in a gas phase or on a substrate. Forming a waveguide material film by using the CVD method requires a volatile compound containing the constitutional components. In KTN or KLTN, as to the compounds of Ta and Nb, halide and alkoxide have high volatility and can be used as the starting material when the CVD method is applied.

As to K and Li compounds, there is not much information available about the materials which provide sufficient vapor pressures. In the case of K in particular, no material has been known which is effective for use with the CVD method. The essential reason for this is that alkali metal elements such as K and Li tend to be ionized easily and cannot easily be kept in a molecular state necessary for vaporization.

SUMMARY OF THE INVENTION

The present invention has been accomplished to overcome these problems and provide an optical waveguide and a method of manufacture thereof, the optical waveguide being capable of having a variety of characteristics not achievable with conventional devices and of forming a waveguide easily.

Another object of this invention is to provide a diffused waveguide and a method of manufacture thereof, the diffused waveguide allowing a KTN crystal to be formed into a waveguide by diffusing Li, a technique not achievable with conventional devices.

To achieve these objective, the present invention provides an optical waveguide comprising: an undercladding layer; a waveguide layer formed on the undercladding layer and having a higher refractive index than that of the undercladding layer; and an overcladding layer covering the waveguide layer and having a lower refractive index than that of the waveguide layer; wherein the undercladding layer is a substrate and the waveguide layer is formed from an optical functional material $KTa_xNb_{1-x}O_3$ (0<x<1).

Further, the substrate is one of a $KTa_yNb_{1-y}O_3$ (0≦y≦1, y≠x) substrate, a MgO substrate, a $MgAl_2O_4$ substrate and a $NdGaO_3$ substrate.

Further, the undercladding layer comprises the substrate and one of $SiO_2$, $KTa_zNb_{1-z}O_3$ (0≦z≦1, z≠x), MgO, $MgAl_2O_4$ and $NdGaO_3$ deposited on the substrate.

Further, the overcladding layer is formed from one of $KTa_uNb_{1-u}O_3$ (0≦u≦1, u≠x), MgO, $MgAl_2O_4$, $NdGaO_3$ and polymer.

Further, an optical waveguide comprises: an undercladding layer; a waveguide layer formed on the undercladding layer and having a higher refractive index than that of the undercladding layer; and an overcladding layer covering the waveguide layer and having a lower refractive index than that of the waveguide layer; wherein the undercladding layer is a substrate and the waveguide layer is formed from an optical functional material $K_{1-v}Li_vTa_xNb_{1-x}O_3$ (0<x<1, 0<v≦0.5).

This invention is characterized in that the optical waveguide is formed from an optical functional material $KTa_xNb_{1-x}O_3$ whose optical properties represented by an electrooptical effect (EO effect), an acoustooptic effect (AO effect) and a figure of merit are remarkably large when compared with those of conventional waveguide materials.

The optical functional material $KTa_xNb_{1-x}O_3$ is a paraelectric crystal material and has a cubic structure with a refractive index of 2.4 at temperature higher than ferroelectric transition. When an external field is applied in the crystal axis direction, the resulting positional displacement of the constitutional elements produces an optical second-order nonlinear effect. The optical nonlinearity constant of this optical functional material is 1,200–8,000 pm/V, significantly larger than, for example, 31 pm/V which is the optical nonlinearity constant of $LiNbO_3$.

The optical nonlinear effect is the result of the positional displacement of constitutional elements caused by the application of an electric field. Hence, the presence or absence of the optical nonlinear effect can be controlled by the application of an electric field. The material $KTa_xNb_{1-x}O_3$ undergoes a ferroelectric phase transition at a composition-dependent Curie temperature of between −250° C. and 400° C. At this Curie temperature as a boundary the material's property changes sharply. For example, its dielectric constant greatly changes from approximately 3,000 to about 20,000. It is therefore possible to create a new optical integrated circuit taking advantage of optical characteristic changes caused by the ferroelectric phase transition.

The Curie temperature varies depending on the composition x of $KTa_xNb_{1-x}O_3$, and adding Li to $KTa_xNb_{1-x}O_3$ can adjust its Curie temperature range.

Further, this invention provides a method of manufacturing an optical waveguide, wherein the optical waveguide comprises an undercladding layer, a waveguide layer formed on the undercladding layer and having a higher refractive index than that of the undercladding layer, and an overcladding layer covering the waveguide layer and having a lower refractive index than that of the waveguide layer, the method comprising steps of: using the undercladding layer as a substrate and forming on the substrate a structure constituting a crystal growth nucleation position; and growing a thin film of an optical functional material $KTa_xNb_{1-x}O_3$ (0<x<1) into a rectangular parallelepiped with the structure as a center to form the waveguide layer.

Further, this invention provides a method of manufacturing an optical waveguide, wherein the optical waveguide comprises an undercladding layer, a waveguide layer formed on the undercladding layer and having a higher refractive index than that of the undercladding layer, and an overcladding layer covering the waveguide layer and having a lower refractive index than that of the waveguide layer, the method comprising the steps of: using the undercladding layer as a substrate and forming on the substrate a structure constituting a crystal growth nucleation position; and growing a thin film of an optical functional material $K_{1-y}Li_yTa_xNb_{1-x}O_3$ (0<x<1, 0<y≦0.5) into a rectangular parallelepiped with the structure as a center to form the waveguide layer.

An ordinary waveguide fabrication process involves depositing a film of the material for a waveguide layer over a large area and then patterning the film into a desired configuration of the waveguide rectangular in cross section by photolithography. This invention takes advantage of the fact that the waveguide material is $KTa_xNb_{1-x}O_3$ crystal and, instead of the ordinary process described above, forms the optical waveguide rectangular in cross section in a single film making step.

The optical waveguide fabrication method of this invention requires depositing a thin film of $KTa_xNb_{1-x}O_3$ with optical characteristics sufficient for light propagation, i.e., satisfactory crystal quality that produces such characteristics, and then forming the film into a predetermined structure at a predetermined location according to a design of the optical integrated circuit. Such an optical quality can be realized by a crystal epitaxial growth method. In a field of semiconductor crystal growth technology, an epitaxial growth method available that grows thin films having a high degree of lattice mismatch between a substrate and a thin film, as in the case of GaN-on-sapphire and GaAs-on-Si, is a micro-channel epitaxy (for example, T. Nishinaga and H. J. Scheel, "Advances in Superconductivity VIII," ed. By H. Hayakawa and Y. Enomoto (Springer-Verlag, Tokyo, 1996) p. 33). This micro-channel epitaxy controls the thin film growth nucleation position by a groove formed on the upper surface of a seed layer on the substrate and improves the crystal quality of the thin film by the horizontal growth of the thin film from the nucleation position.

In this invention, since the nucleation position and the thin film growth direction can be controlled, when the crystal material has a strong crystal habit, it is possible to create a structure enclosed by the singular faces of the crystal material. The $KTa_xNb_{1-x}O_3$ crystal material used in this invention has a cubic crystal structure and a strong crystal habit which is constructed by the {100} singular faces, so that a rectangular thin film enclosed by the {100} planes is likely to grow. In the process of growing a thin film, the growth nuclei on the substrate are generated starting from where the surface energy of the substrate is smallest. When there are holes or grooves on a planar substrate, the areas of the holes or grooves have side surfaces in addition to the bottom surfaces, increasing the number of contact surfaces with which the material supplied onto the substrate comes into contact. It is apparent also from the classical theory of crystal growth that an increase in the number of contact surfaces lowers the surface energy of the areas of the holes or grooves and thus the probability of crystal nuclei being generated in these areas becomes higher than in other planar areas.

Therefore, by forming in advance holes or grooves in that substrate contact surface where a rectangular waveguide is to be formed, the $KTa_xNb_{1-x}O_3$ crystal material can be made to start growing a thin film at the holes or grooves as the growth nucleation points and fill these holes or grooves. If the growth of the $KTa_xNb_{1-x}O_3$ crystal material is continued, a growth in the horizontal direction of the substrate, i.e., along the free surface, also starts, in addition to the growth in the vertical direction of the substrate at the holes or grooves. At this time, as to the growth in the horizontal direction of the substrate, the film being grown is limited in shape by the {100} singular faces of the $KTa_xNb_{1-x}O_3$ crystal material. Thus, a film of $KTa_xNb_{1-x}O_3$ having a rectangular parallelepiped structure enclosed by {100} planes can be produced.

Further, this invention provides a diffused waveguide formed by diffusing ions in a crystal and using as a waveguide core an area of the crystal diffused with the ions and having a higher refractive index than those of surrounding areas, wherein the crystal has a composition of $KTa_{1-x}Nb_xO_3$ and the ions are Li.

Further, this invention forms a waveguide core with a higher refractive index than those of the surrounding areas by diffusing Li ions in the crystal of a composition of $KTa_{1-x}Nb_xO_3$.

That is, this invention is characterized by Li ions being diffused in the KTN crystal to form a core with a high refractive index. Li ions can be thermally diffused by substituting a K site and the KLTN crystal having the composition of $K_{1-y}Li_yTa_{1-x}Nb_xO_3$ also has a performance equal to or higher than that of the KTN crystal. Therefore, there is no possibility of characteristic degradation due to ion diffusion. Further, the relative index difference obtained by adding Li through thermal diffusion is 2% or higher, which is sufficient for the fabrication of a waveguide. This means that Li is an appropriate ion for forming a waveguide. The melt containing $LiNO_3$ used for diffusion has a low melting point of 261° C., which means that a stable melt can be obtained easily. This melt has a high water solubility so that, after the diffusion processing, it can be easily washed away with water. Thus, it has no adverse effects on the subsequent thermal diffusion processing in a gas.

As described above, the manufacture of a diffused waveguide using Li ions has advantages that it can control the refractive index without degrading its characteristics and that the diffusion process using $LiNO_3$ is simple and can perform diffusion at low temperatures.

Further, this invention provides a method of manufacturing a crystal film having a composition of $KTa_{1-x}Nb_xO_3$ (0<x<1), the method comprising steps of: introducing, in the form of gas flows into a reaction system having a substrate, β-diketone complex of K (R is an alkyl group with a carbon number of 1 to 7, R' is an alkyl group or $C_nF_{2n+1}$, and n is 1 to 3) expressed by a general formula (1) as a first initial material component,

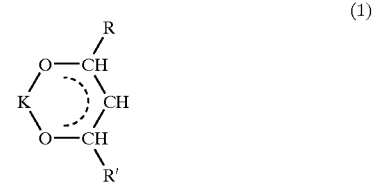

at least one of a gaseous Ta compound and a volatile Ta compound as a second initial material component, at least one of a gaseous Nb compound and a volatile Nb compound as a third initial material component, and an oxygen-containing gas used as an oxidizer, and reacting these components in a gas phase or on the substrate to form a crystal of $KTa_{1-x}Nb_xO_3$ on the substrate.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be described in detail. In realizing an optical waveguide of this invention it is necessary to deposit a thin film of $KTa_xNb_{1-x}O_3$ having an satisfactory optical characteristic or crystal quality for lightwave propagation and form it into a desired structure at a predetermined location according to a design of an optical integrated circuit. The process of manufacturing an optical waveguide according to the present invention can be classed largely into four basic processes:

1) Forming a $KTa_xNb_{1-x}O_3$ thin film on a substrate;
2) Manufacturing a waveguide layer by processing the $KTa_xNb_{1-x}O_3$ thin film;
3) Manufacturing a mechanism for applying external fields to the $KTa_xNb_{1-x}O_3$ waveguide layer; and
4) Manufacturing a cover layer over the $KTa_xNb_{1-x}O_3$ waveguide layer.

These four manufacturing processes are referred to as a manufacturing process 1, a manufacturing process 2, a manufacturing process 3 and a manufacturing process 4 respectively and will be explained in the following.

The order of these four manufacturing processes is determined according to a design structure of the optical integrated circuit. In addition, the determination of this order takes into account whether a material region already fabricated by one manufacturing process may or may not be degraded in quality by the subsequent manufacturing process. Hence, it should be noted that the actual order of the manufacturing processes does not necessarily agree with the order indicated by the accompanying numbers.

Since the waveguide layer material is $KTa_xNb_{1-x}O_3$, the materials forming the substrate and the cover layer need to have a sufficient refractive index difference with respect to the refractive index of $KTa_xNb_{1-x}O_3$ to confine light in the waveguide layer.

[Embodiment 1]

Figure 1:
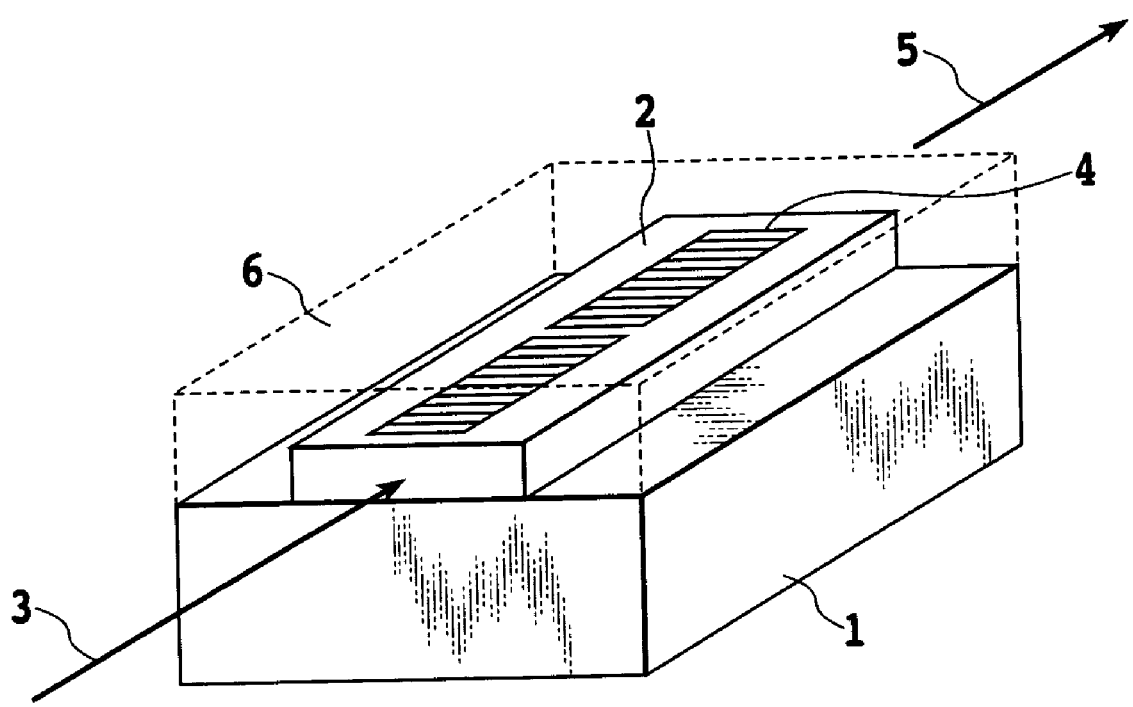
FIG. 1 is a perspective view showing an example fabrication of an optical waveguide applying the present invention.

FIG. 1 is a perspective view showing the fabrication of an optical waveguide applying the present invention. A basic fabrication shown here as an example waveguide structure for explanation uses a ridge type optical waveguide as an optical waveguide and an electric field application from an electrode as an external field application mechanism. In the figure, reference number 1 represents a substrate that functions as an undercladding layer, 2 a waveguide layer having a refractive index higher than that of the substrate 1 and formed from a film of an optical functional material $KTa_xNb_{1-x}O_3$ (0<x<1), 3 an input optical signal, 4 an electrode, 5 an output optical signal, and 6 an overcladding layer (cover layer) covering the waveguide layer and having a refractive index lower than that of the waveguide layer $KTa_xNb_{1-x}O_3$ film 2.

The input optical signal 3 is transmitted into the $KTa_xNb_{1-x}O_3$ film 2. The $KTa_xNb_{1-x}O_3$ film 2 changes its optical property by an external voltage signal applied to the electrode 4. Thus, the optical signal is modulated by the film's optical property change as it passes through the $KTa_xNb_{1-x}O_3$ film 2. The modulated optical signal is taken out as the output optical signal 5.

The waveguide layer may use as an alternative an optical functional material $K_{1-v}Li_vTa_xNb_{1-x}O_3$ (0<x<1, 0<v≦0.5).

Although in the following embodiments only the manufacturing methods we tested will be described, it is quite obvious to persons skilled in the art that, for the individual material region manufacturing processes classified earlier, known thin film manufacturing techniques, such as liquid phase epitaxy, physical deposition, chemical vapor deposition and sol-gel processing, can be applied and that the known masking and etching techniques can be applied to the forming of individual structures.

[Embodiment 1-1]

First, the manufacturing process 1 will be explained. In this embodiment, the liquid phase epitaxy capable of forming a single crystal film with high quality was adopted as the method of depositing a high quality $KTa_xNb_{1-x}O_3$ film on the substrate 1. A $KTa_xNb_{1-x}O_3$ (0≦x≦1) substrate, a MgO substrate, a $MgAl_2O_4$ substrate and a $NdGaO_3$ substrate were used for the substrate 1. As the buffer layer (undercladding layer) were used a semiconductor Si substrate, a GaAs substrate and an InP substrate, which were formed by depositing such materials as $SiO_2$, $KTa_xNb_{1-x}O_3$ (0≦x≦1), MgO, $MgAl_2O_4$ and $NdGaO_3$.

To prevent a possible contamination, the $KTa_xNb_{1-x}O_3$ film 2 was formed by using potassium oxide and $KTa_xNb_{1-x}O_3$ oxide as a solvent and a solute, respectively, and by using a self-flux method. As the potassium oxide solvent, a mixture of $KVO_3$ and $K_2O$ ($KVO_3$=30–70 mol %) or $K_2CO_3$ carbonate was used. When a $KTa_yNb_{1-y}O_3$ (0≦y≦1) substrate was used, a material with x (0<x<1) composition different from the substrate composition was selected so that there was a difference in refractive index between the substrate and the waveguide layer. Hence, in the following description the material used as the waveguide layer and the material used as the substrate 1 are shown to have compositions of $KTa_xNb_{1-x}O_3$ (0<x<1) and $KTa_yNb_{1-y}O_3$ (0≦y≦1), respectively.

To change the characteristic of the waveguide layer, 0–10 mol % of $LiCO_3$ was added to $KTa_xNb_{1-x}O_3$ (0<x<1). The solute concentration with respect to the solvent was set to 30–50 mol %, a concentration range where the object material $KTa_xNb_{1-x}O_3$ is shown in a phase diagram to precipitate as an initial crystal. The film deposition temperature was set at 0–10° C. supercooled from a solid-solution equilibrium temperature of 1,050–1,360° C. determined from the liquidus of the phase diagram and the concentration of the solute used. This temperature was used considering the fact that a low film deposition rate constitutes one of conditions for forming a high quality film. However, there was also a case where a growth rate with a larger supercooling had to be used when considering a lattice matching between the $KTa_xNb_{1-x}O_3$ and the substrate material used and a reactivity between the solution and the substrate used.

The film deposition rate achieved was around 1 μm/min. The film deposition time was determined from the precalculated deposition rate and the desired film thickness.

The crystal quality of the $KTa_xNb_{1-x}O_3$ film deposited to a thickness of 2 μm was best when the substrate used the same material as the film material, i.e., the material that satisfies the homo epitaxial condition. The $KTa_xNb_{1-x}O_3$ film thus formed has an optical quality of 0.10 dB/cm in terms of optical transmission loss. The $KTa_xNb_{1-x}O_3$ film was verified by the X-ray diffraction method to be oriented in a <100> axis direction.

[Embodiment 1-2]

Next, the manufacturing process 2 will be explained. Photolithography was used to process the $KTa_xNb_{1-x}O_3$ film to form a waveguide layer of a ridge type optical waveguide.

A resist was applied to the thin film thus formed and was exposed and developed by using a mask for a 2 μm wide waveguide. The material was then etched by an ion milling method and the residual resist was removed, thereby forming a waveguide layer of the ridge type waveguide. The waveguide layer is nearly a 2 μm square and an observation of the side wall using a SEM (scanning electron microscope) found no significantly roughened surface.

The measurement of loss of this ridge type waveguide at a wavelength of 1.55 μm showed a loss value of 0.99 dB/cm, which means that the waveguide layer formed is good enough so that undulations of the surface as a result of processing can be neglected.

[Embodiment 1-3]

Next, the manufacturing process 3 will be explained. The electrode material is preferably a metal or conductive oxide highly chemically stable with the $KTa_xNb_{1-x}O_3$ film. In this embodiment, we will describe a result of manufacture with Au used as an electrode material.

In manufacturing an Au electrode of a shape according to the design, techniques commonly used in the semiconductor integrated circuit manufacturing process were applied. More specifically, the Au thin film deposited by sputtering was processed by photolithography.

The techniques used in this manufacturing process 3 are common and therefore their explanations are omitted.

[Embodiment 1-4]

The material used for the cover layer 6 was chosen from among such oxides as $KTa_uNb_{1-u}O_3$ ($0 \leq u \leq 1$), MgO, $MgAl_2O_4$ and $NdGaO_3$, and a polymer that retards degradation of the already fabricated waveguide and electrode structure. In this embodiment, we will describe a result of fabrication obtained when a sputtering method with a low substrate temperature during evaporation was used to deposit $KNbO_3$.

For the fabrication of the cover layer 6 an opposed type ion sputtering apparatus was used. Nb and $K_2CO_3$ targets were mounted on one surface and, on the opposing surface 2–10 cm from the substrate, was mounted. As an ambient gas a Xe gas was used at a pressure of $1\times10^{-4}$ to $3\times10^{-4}$ Torr. A voltage was applied between the targets and the substrate to produce an energy of 400–800 eV for Nb ions and $K_2CO_3$ ions to deposit a film of $KNbO_3$ cover layer at the substrate temperature of 500–700° C. The film was deposited to a thickness of 0.1 μm at a rate of 3 Å/min. The thin film thus obtained was verified to be $KNbO_3$ by the X-ray diffraction method.

The same technique as used in the manufacturing process 2 was used to open holes in the upper surface of the electrode 4 to lead conductive wires into the electrode 4 formed by the manufacturing process 3.

The basic optical integrated circuit fabricated by the manufacturing process 1, manufacturing process 2, manufacturing process 3 and manufacturing process 4 in that order was cut and its cross section was observed with a SEM, which revealed no significant structural deterioration. Further, the performance of the electrode 4 connected with conductive wires was evaluated using the input optical signal 3 with a wavelength of 1.55 μm. It was confirmed that the wavelength conversion device and the modulator had high performances, i.e., high efficiency and low noise, as expected from the design.

We have described a case where the waveguide layer of $KTa_xNb_{1-x}O_3$ (0<x<1) was formed on a substrate. In a general core-cladding structure, optical waveguides can of course be provided with a variety of characteristics, not possible with the conventional techniques, by forming the core from $KTa_xNb_{1-x}O_3$ (0<x<1).

[Embodiment 2]

Figure 2:
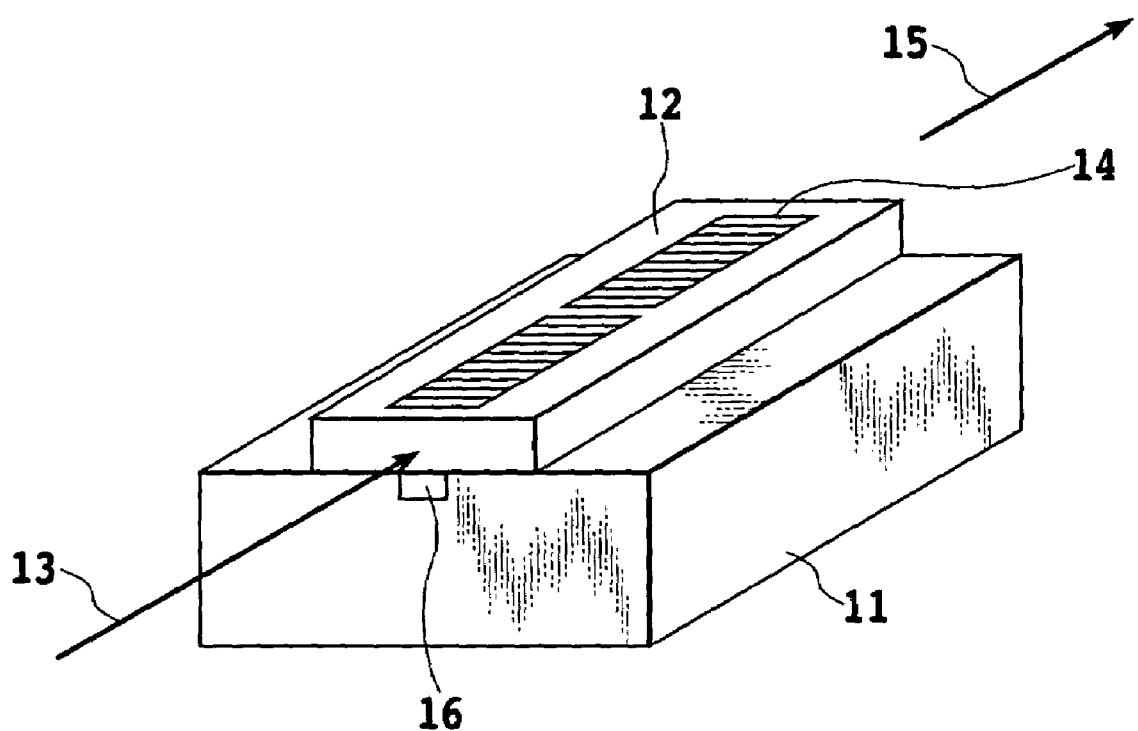
FIG. 2 is a perspective view showing another example fabrication of an optical waveguide applying the present invention.

FIG. 2 is a perspective view showing another fabrication of an optical waveguide applying the present invention. In this case, the waveguide structure is a rectangular parallelepiped extending along the substrate. In the following, the rectangular parallelepiped structure film is described to be fabricated by a thin film growth method. In the figure, reference numeral 11 represents a substrate, 12 a $KTa_xNb_{1-x}O_3$ film, 13 an input optical signal, 14 an electrode, 15 an output optical signal, and 16 a groove. The input optical signal 13 is transmitted into the $KTa_xNb_{1-x}O_3$ film 12. The $KTa_xNb_{1-x}O_3$ film 12 changes its optical property by an external voltage signal applied to the electrode 4. Thus, the optical signal is modulated by the film's optical property change as it passes through the $KTa_xNb_{1-x}O_3$ film 12. The modulated optical signal is taken out as the output optical signal 15.

To deposit a high quality $KTa_xNb_{1-x}O_3$ film on the substrate, a liquid phase epitaxy capable of forming a high quality single crystal film was selected as a film deposition method. The substrate material was chosen by considering mainly a lattice matching, a basic condition for the epitaxial growth. The substrate was chosen from among a $KTa_xNb_{1-x}O_3$ ($0 \leq x \leq 1$) substrate, a MgO substrate, a $MgAl_2$ substrate and a $NdGaO_3$ substrate.

Further, a semiconductor Si substrate, GaAs substrate or InP substrate deposited with $SiO_2$, $KTa_xNb_{1-x}O_3$ ($0 \leq x \leq 1$), MgO, $MgAl_2O_4$ or $NdGaO_3$ was also used. A photolithography method commonly used in the fabrication of semiconductor integrated circuits, such as masking and etching or masking and ion milling, was used to pattern on the substrate the groove 6, 0.1–0.2 μm wide and 0.01 μm or more deep, along a center line of an area where the waveguide is to be formed.

To prevent a possible, the film was formed by using potassium oxide and $KTa_xNb_{1-x}O_3$ oxide as a solvent and a solute, respectively, and also using a self-fluxing method. As the potassium oxide solvent, a mixture of $KVO_3$ and $K_2O$ ($KVO_3$=30–70 mol %) or $K_2CO_3$ carbonate was used. When a $KTa_xNb_{1-x}O_3$ ($0 \leq x \leq 1$) substrate was used, a material $KTa_{x'}Nb_{1-x'}O_3$ with x' ($0 \leq x' \leq 1$) composition different from the substrate composition was selected so that there was a difference in refractive index between the substrate and the waveguide. Further, 0–10 mol % of $LiCO_3$ was also added as an additive.

The above process resulted in a thin film with $KTa_xNb_{1-x}O_3$ replaced with $K_{1-y}Li_yTa_xNb_{1-x}O_3$ ($0 \leq x \leq 1$, $0 \leq y \leq 0.5$; x and y are compositions). The solute concentration with respect to the solvent was set to 30–50 mol %, a concentration range where the object material $KTa_xNb_{1-x}O_3$ is shown in a phase diagram to precipitate as an initial crystal. The film deposition temperature was set at 0–10° C. supercooled from a solid-solution equilibrium temperature of 1,050–1,360° C. determined from the liquidus of the phase diagram and the concentration of the solute used. This temperature was used considering the fact that a low film deposition rate constitutes one of conditions for forming a high quality film. However, there was also a case where a growth rate with a larger supercooling had to be used when considering a lattice matching between the $KTa_xNb_{1-x}O_3$ and the substrate material used and a reactivity between the solution and the substrate used. The film deposition rate achieved was around 1 μm/min. The film deposition time was determined from the precalculated deposition rate and the desired film thickness.

The crystal quality of the $KTa_xNb_{1-x}O_3$ film deposited to a thickness of 2 μm was best when the substrate was formed from the same material or constitutional elements as the film material, i.e., the material that satisfies the homo epitaxial condition. The $KTa_xNb_{1-x}O_3$ film thus formed has an optical quality of 0.10 dB/cm in terms of optical transmission loss at a wavelength of 1.55 μm. The $KTa_xNb_{1-x}O_3$ film was verified by the X-ray diffraction method to be oriented in a <100> axis direction.

As for the structure of the waveguide obtained, it extends along the groove and has a rectangular cross section 2 μm wide with the groove in the substrate as a center. The observation using a SEM (scanning electron microscope) showed that the sidewall surfaces of the waveguide had microsteps made up of {100} surfaces with a better planarity than that of the sidewall surfaces of the waveguide fabricated by the conventional photolithography. Strictly speaking, its cross section had projections in the groove region at positions of crystal growth nuclei but since the projections were small compared with the rectangular cross-sectional area, their influence on the transmitted light was small.

Rather than providing the groove structure on the substrate, forming a groove or holes where crystal growth nuclei were to be created was able to produce the similar effect.

Figure 3:
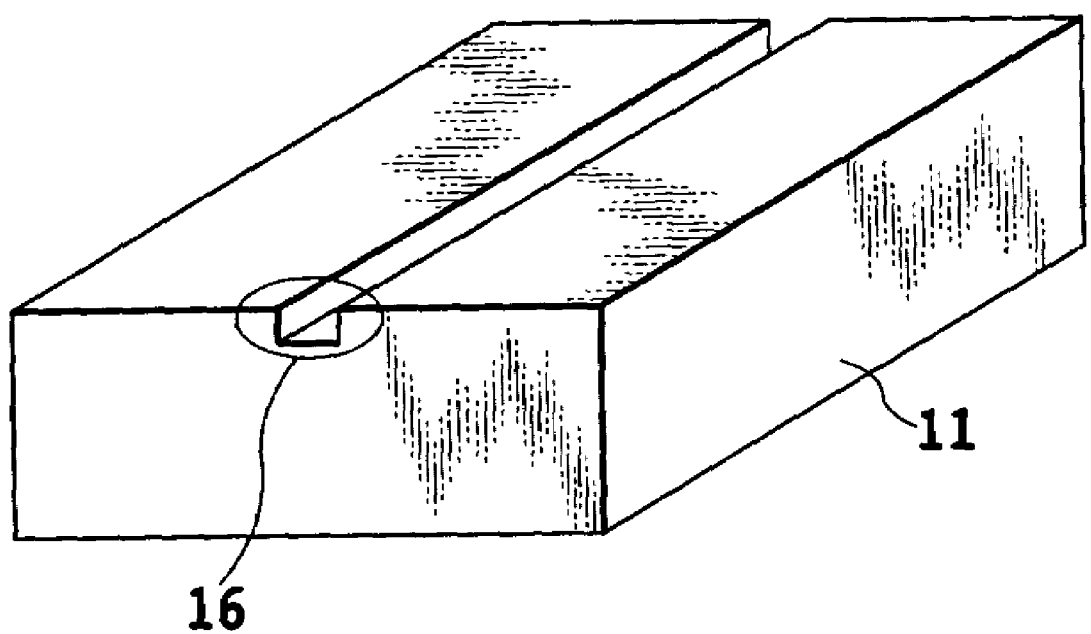
FIG. 3 is a perspective view showing a substrate formed with a groove as a crystal growth nucleation position for a $KTa_xNb_{1-x}O_3$ crystal.

FIG. 3 shows a substrate formed with a groove at positions of crystal growth nuclei for the $KTa_xNb_{1-x}O_3$ crystal. In the figure, reference numeral 11 denotes the substrate and 16 the groove.

Figure 4:
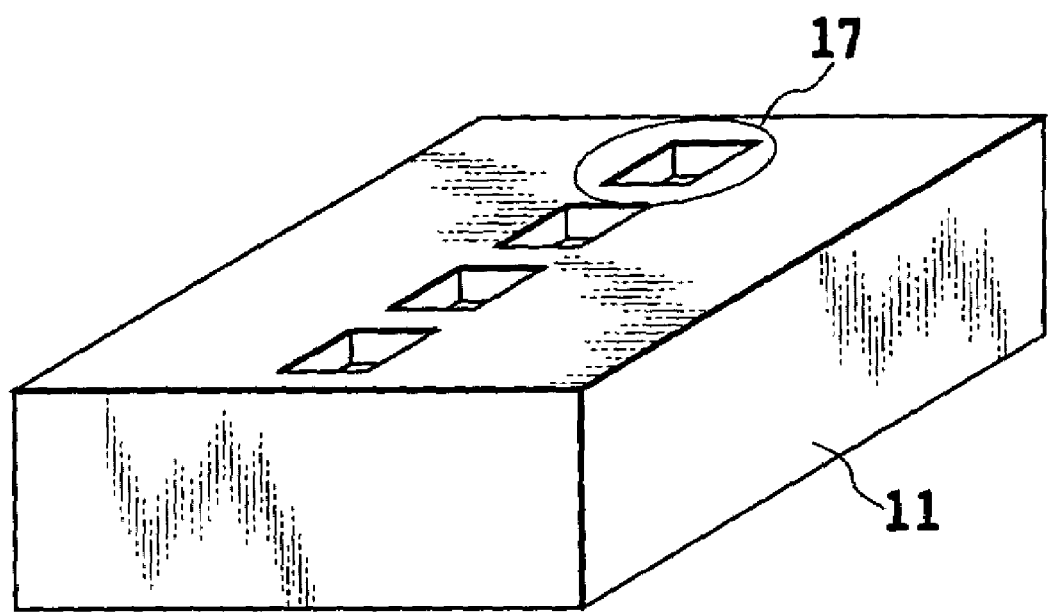
FIG. 4 is a perspective view showing a substrate formed with holes as crystal growth nucleation positions for $KTa_xNb_{1-x}O_3$ crystals.

FIG. 4 shows a substrate formed with holes at positions of crystal growth nuclei for the $KTa_xNb_{1-x}O_3$ crystal. In the figure, reference numeral 11 denotes the substrate and 17 the holes.

Instead of processing the substrate, forming a groove or holes in the electrode layer on the substrate was able to produce the similar effect.

Figure 5:
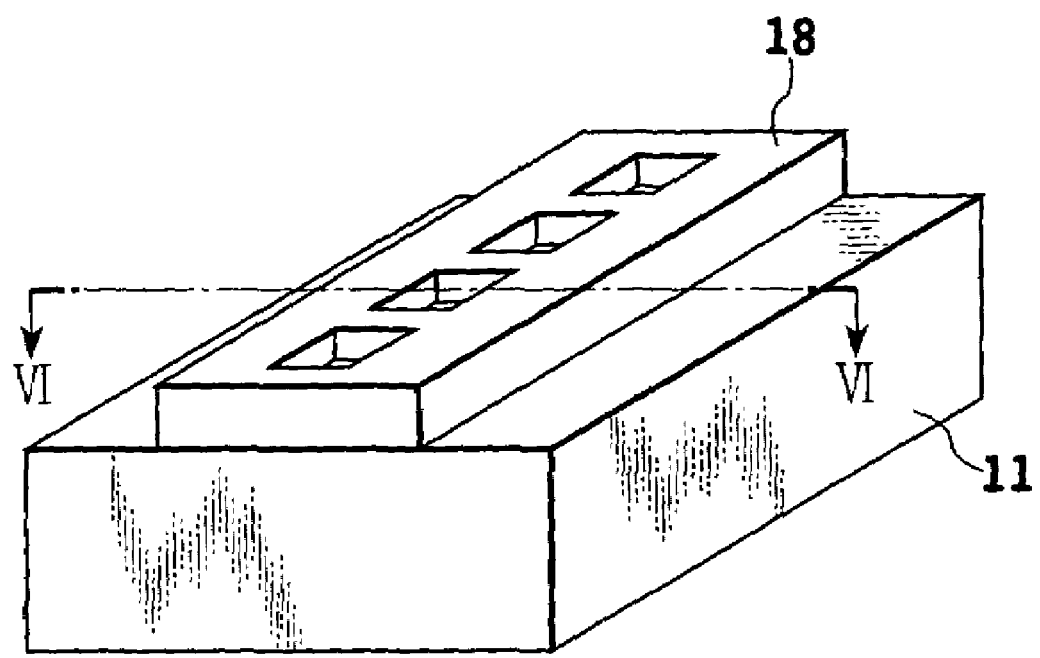
FIG. 5 is a perspective view showing a substrate having an electrode layer formed with holes as crystal growth nucleation positions for $KTa_xNb_{1-x}O_3$ crystals.
Figure 6:
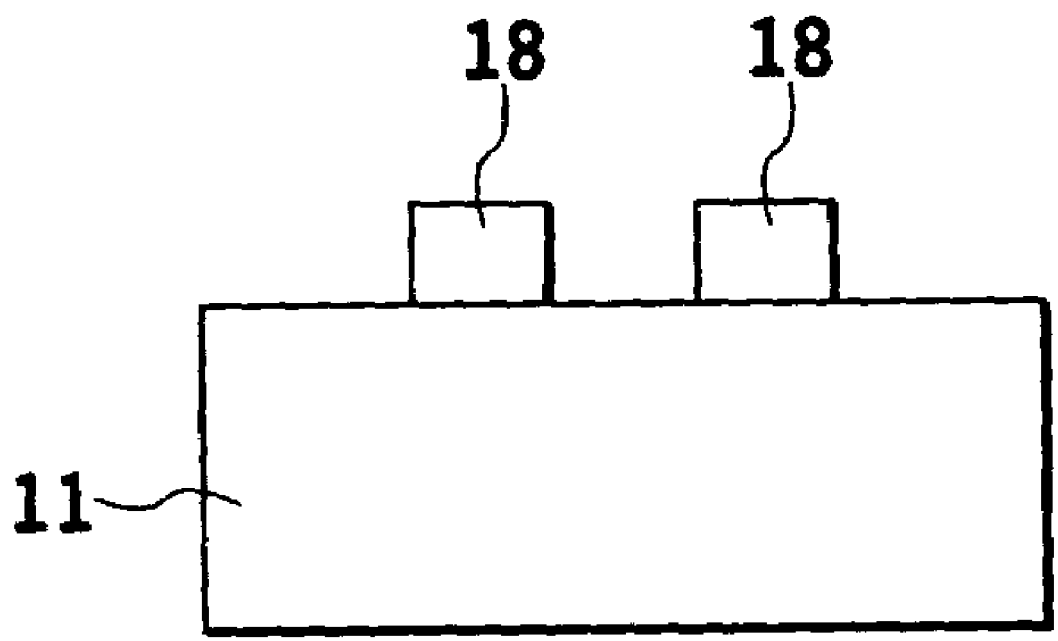
FIG. 6 is a cross-sectional view taken along the line VI—VI of FIG. 5.

FIG. 5 shows a substrate having an electrode layer formed with holes at positions of crystal growth nuclei for the $KTa_xNb_{1-x}O_3$ crystal. FIG. 6 is a cross section taken along the line VI—VI of FIG. 5. In the figure, reference number 11 denotes the substrate and 18 the holed electrode layer.

[Embodiment 3]

[Embodiment 3-1]

Next, a method of manufacturing a diffused waveguide by diffusing Li ions in a crystal of the core formed from a crystal material of $KTa_xNb_{1-x}O_3$ composition will be explained.

A KTN crystal plate 10 mm square and 0.5 mm thick which was optically polished on both sides was put in a platinum boat together with $LiNO_3$ powder. They were heated in the atmosphere at 300° C., 400° C., 500° C. and 550° C. for 10 hours each. $LiNO_3$ with a melting point of 261° C. melted when heated and the KTN crystal plate was soaked in the $LiNO_3$ liquid. Then, the specimen was cooled in a furnace down to a room temperature and then the boat was taken out. In either case, $LiNO_3$ was in a solid form when taken out. Hence, the boat was washed with pure water and the crystal substrate was taken out. The diffusion state of Li ions in the specimen was analyzed by the SIMS (secondary ion mass spectrometry).

Of the specimens described above, the one heat-treated at 550° C. appeared opaque white at the surface and partly flaked. This is considered due to the phenomenon in which the Li ion concentration at the crystal surface becomes locally too high causing a density difference with respect to the KTN crystal. Hence, it is desired that the ion diffusion be performed at or below 500° C.

Figure 7:
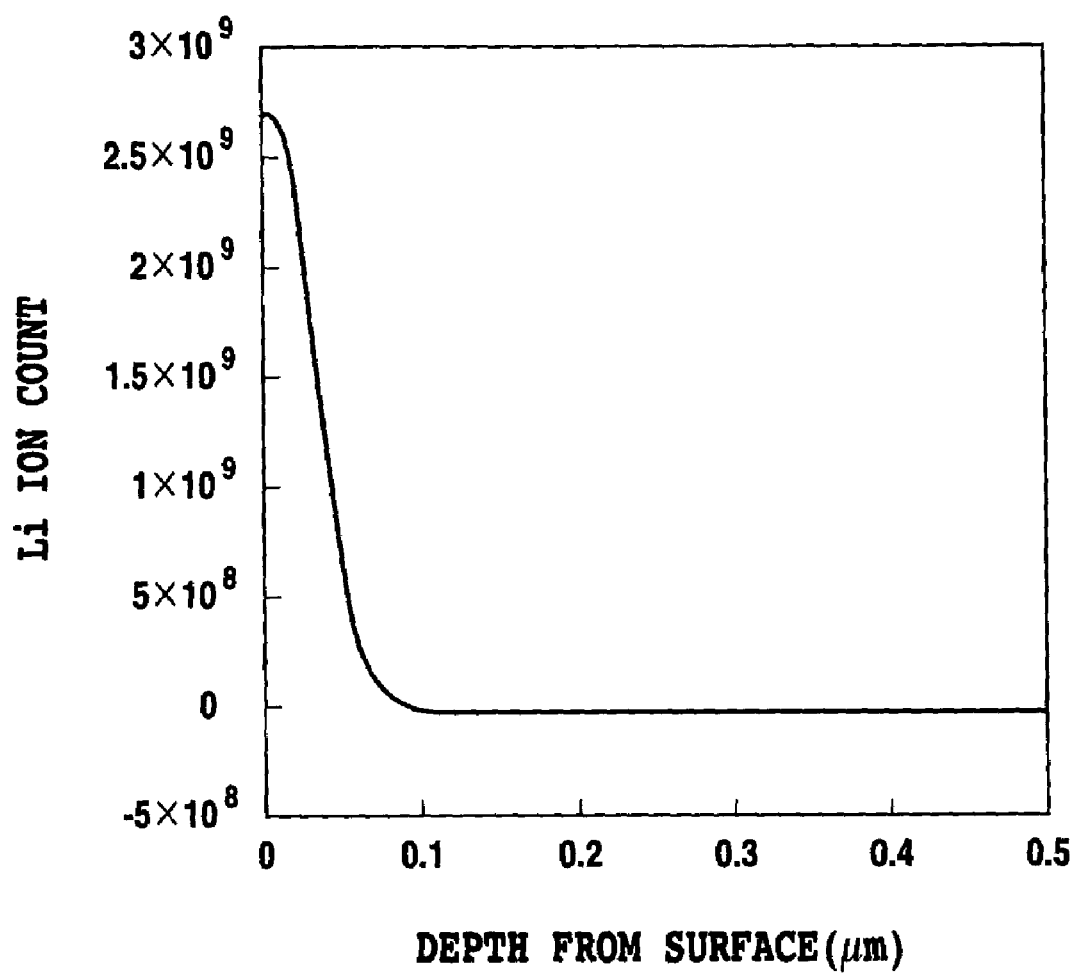
FIG. 7 is a graph showing a SIMS analysis result of a Li ion distribution in Embodiment 3-1.

In this embodiment, a Li ion diffusion profile obtained from the 500° C. heat treatment is shown in FIG. 7. As can be seen from FIG. 7, it is verified that the heat treatment in $LiNO_3$ has resulted in the ion diffusion. A temperature increase caused an increase in the ion concentration and the diffusion distance. The crystal diffused with Li was heated in the atmosphere at 700° C. for 10 hours to perform an internal diffusion of Li ions.

Figure 8:
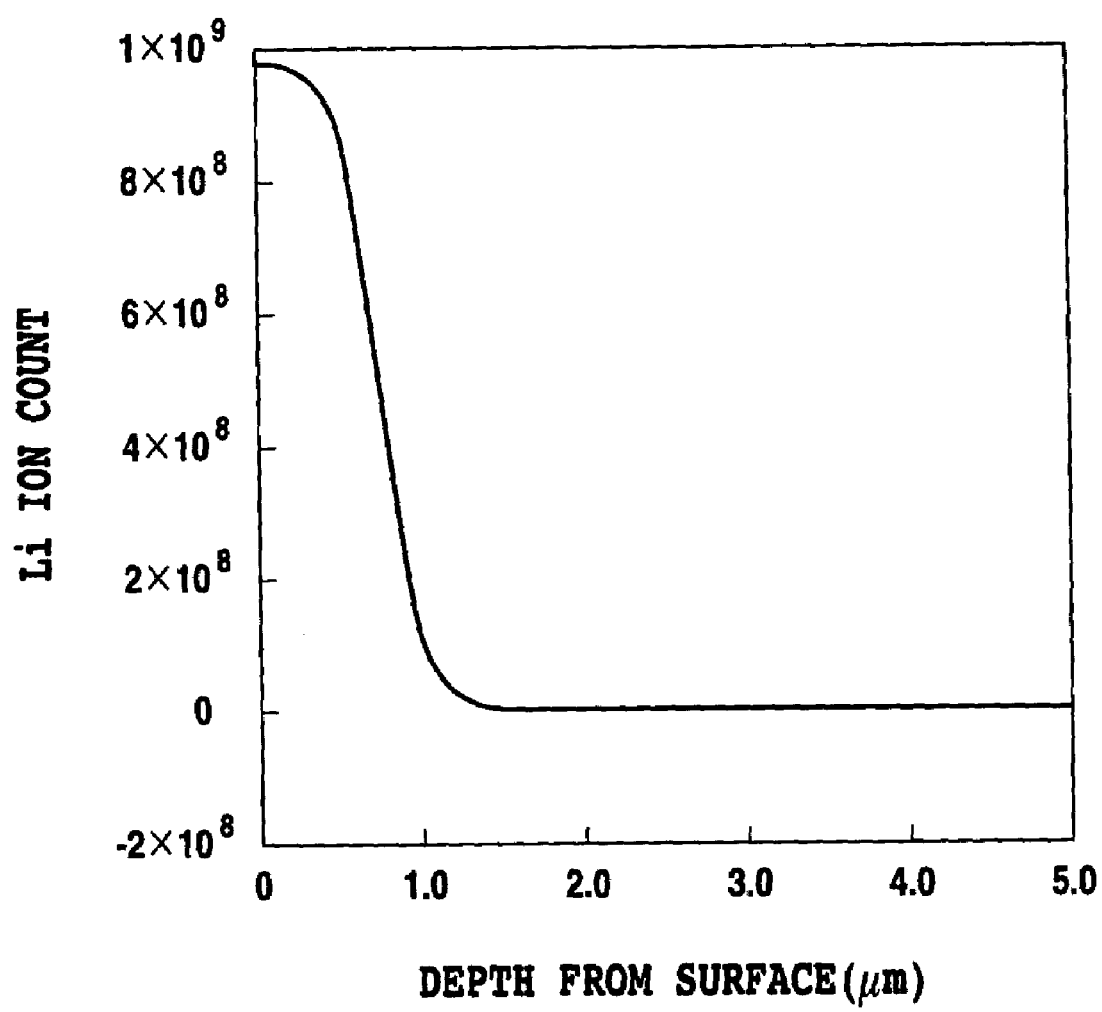
FIG. 8 is a graph showing a SIMS analysis result of a Li ion distribution after an internal diffusion in Embodiment 3-1.
Figure 9:
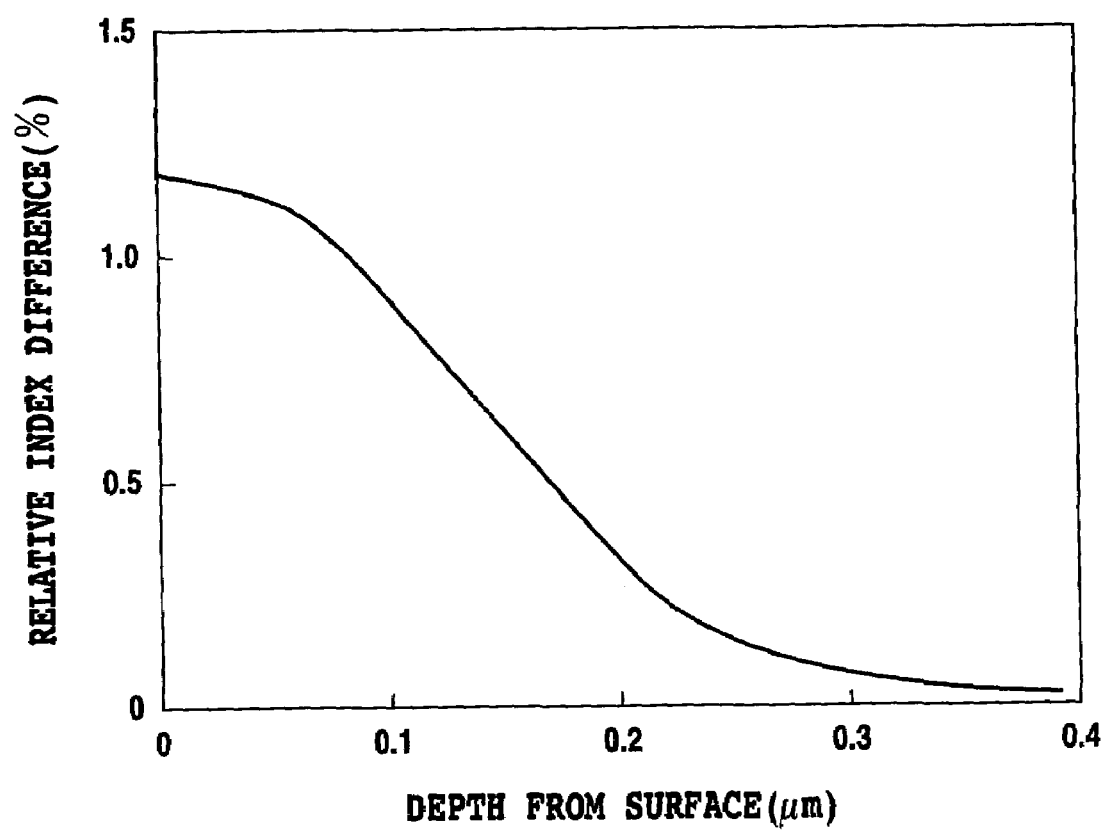
FIG. 9 is a graph showing a refractive index distribution after an internal diffusion of Li ions in Embodiment 3-1.

A SIMS analysis result for Li ions is shown in FIG. 8. FIG. 9 shows a refractive index distribution estimated by the IWKB method using an effective refractive index measured in each mode by a prism coupling. As can be seen from FIG. 8 and FIG. 9, a moderately curved refractive index distribution is formed. A relative index difference on the surface portion is 1% or higher and it is apparent that the Li diffusion can implement an index difference large enough to function as a waveguide.

Further, while in this embodiment the internal diffusion was performed in the atmosphere, it may be done in the presence of oxygen, inert gas, water vapor or a mixture of these gases to produce the similar effects.

Using the photolithography, a Pt mask pattern was formed on the KTN crystal surface and a linear portion 1 μm wide not deposited with Pt was formed. The crystal was subjected to the Li diffusion in the same way as in Embodiment 3-1. The heat treatment in $LiNO_3$ was performed at 400° C. for 10 hours, after which the internal diffusion was carried out in the presence of oxygen at 700° C. for 5 hours. Then, the Pt mask was etched away by nitric acid. The crystal used in this embodiment is 20 mm square and 0.5 mm thick.

Therefore, this method can form a linear waveguide 20 mm long. The waveguide thus formed was a single-mode waveguide with a mode field diameter of 8 μm at a wavelength of 1.55 μm. After being applied with anti-reflection coating at both end faces, the waveguide was aligned and connected with single-mode fibers using UV resin. The insertion loss measured at the wavelength of 1.55 μm was 2.5 dB and the waveguide loss taking the losses at end faces into account was 0.1 dB/cm.

As described above, with the method of Embodiment 3-1 of this invention, it is seen that a single-mode waveguide with small losses can be fabricated. By changing the diffusion temperature in the range of between 300° C. and 500° C. and the diffusion time in the range of between 2 and 100 hours, it was found possible to change the mode field diameter arbitrarily.

[Embodiment 3-2]

The Li diffusion was performed under the same condition as in Embodiment 3-1 and Pt was etched, after which the crystal was heated in a liquid of melted $KNO_3$ at 400° C. for five hours. When the crystal containing Li ions is heated in the liquid of melted $KNO_3$, Li ions diffuse into the $KNO_3$ liquid from those portions of the crystal surface where the Li concentrations are high, and K ions in the $KNO_3$ liquid diffuse into the crystal. As a result, near the surface of the crystal, Li ions are replaced with K ions, reducing the Li ion concentrations.

Then, the specimen was cooled down to a room temperature and the solidified $KNO_3$ was washed away to recover the crystal substrate. The crystal substrate was then heated in the atmosphere at 650° C. for 10 hours to obtain a crystal formed with a waveguide.

Figure 10:
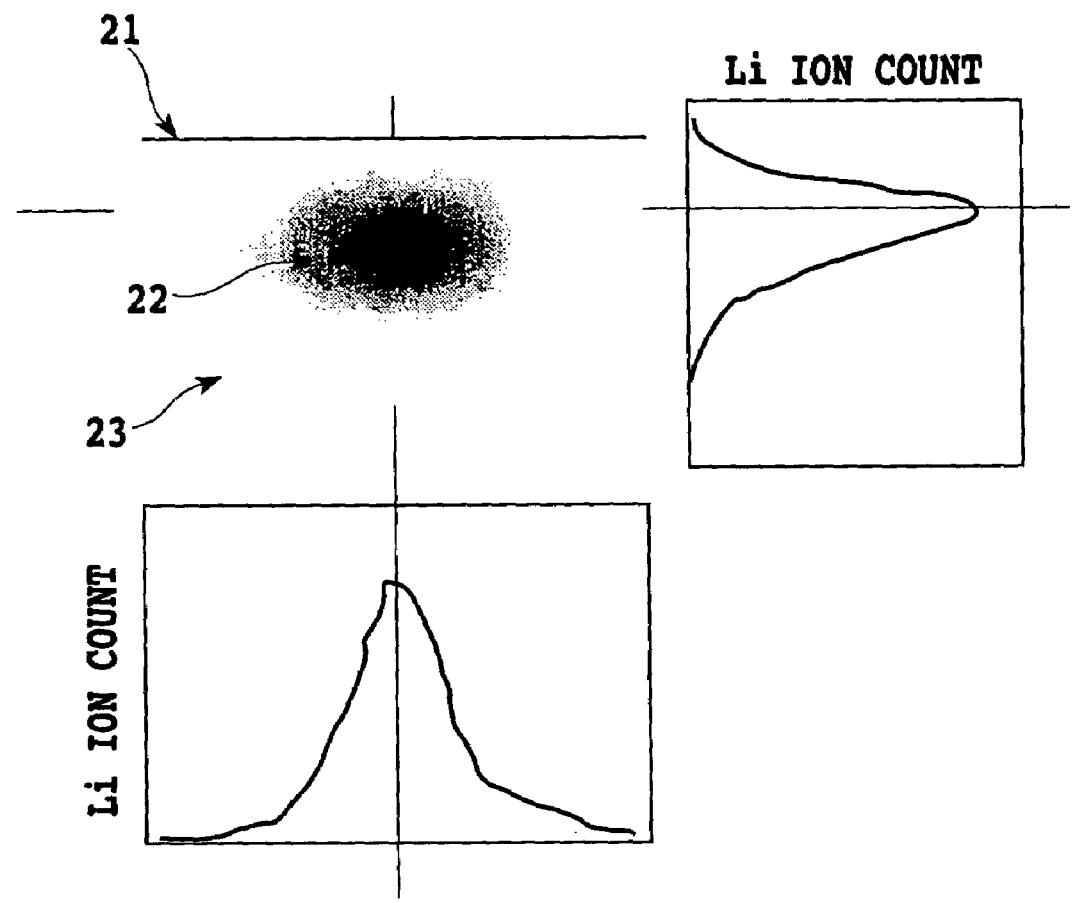
FIG. 10 illustrates a cross-sectional view of a waveguide after a rediffusion of K, and a diagram showing a SIMS analysis result of a Li ion distribution in Embodiment 3-2.

The Li ion distribution in the waveguide manufactured according to this method was measured by the SIMS in the depth direction and in the horizontal direction. The result of measurement is shown in FIG. 10. As shown in FIG. 10, in addition to the method of Embodiment 3-1 described above, performing the heat treatment in KNO$_3$ made it possible to fabricate a waveguide with an almost symmetrical ion distribution. This waveguide exhibited no difference in light transmission characteristic between a TE mode and a TM mode. With the method of this embodiment, a diffused waveguide was obtained which has no polarization dependency. Its waveguide loss as measured by a technique similar to that used in Embodiment 3-1 was 0.13 dB/cm and even the heat treatment in KNO$_3$ resulted in no significant increase in loss. It is therefore found that the method of this embodiment is effective in making the waveguide independent of polarization. Reference number 21 denotes the surface, 22 the Li ion diffusion area (core), and 23 the cladding.

[Embodiment 3-3]

On the linear waveguide fabricated by the method of Embodiment 3-1 an electrode pattern with a period of about 12 μm was formed. The opposite surface was deposited with gold to form a lower electrode. The crystal was placed on a Peltier element so that its temperature can be controlled. The cutoff wavelength for the multimode is 0.7 μm and, for longer wavelengths, the waveguide functions as a single-mode waveguide. The length of the waveguide manufactured was 3 cm and the loss of the waveguide was 0.15 dB/cm.

Figure 11:
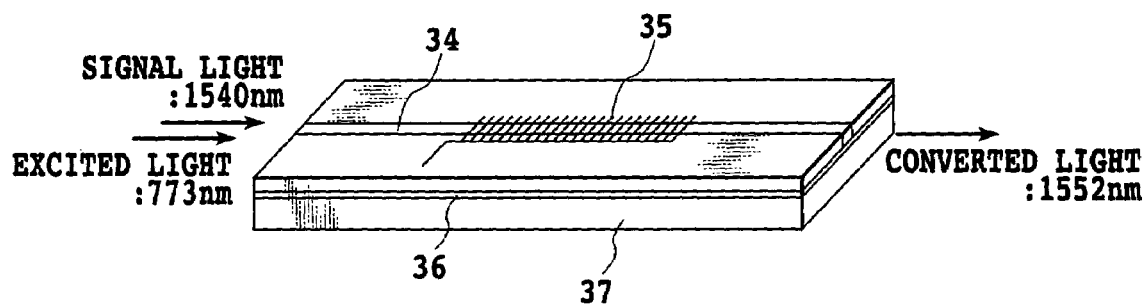
FIG. 11 is a perspective view showing a fabrication of a wavelength conversion device in Embodiment 3-3.

FIG. 11 shows the fabrication of a device manufactured in this embodiment. An electrode pitch corresponds to a grating pitch that realizes a quasi-phase matching required to perform a wavelength conversion on a 1.55 μm band with a 0.775 μm light used as a pump light. In this case, the electrode pitch is 12 μm. A voltage corresponding to 1 kV/cm was applied to the electrode; using polarization maintaining fibers, a signal light of 1.54 μm and a pump light of 0.775 μm were simultaneously launched into the device; and an output light was measured using an optical spectrum analyzer. Reference number 34 designates a Li diffused waveguide, 35 an upper electrode, 36 a lower electrode, and 37 a Peltier element.

Figure 12:
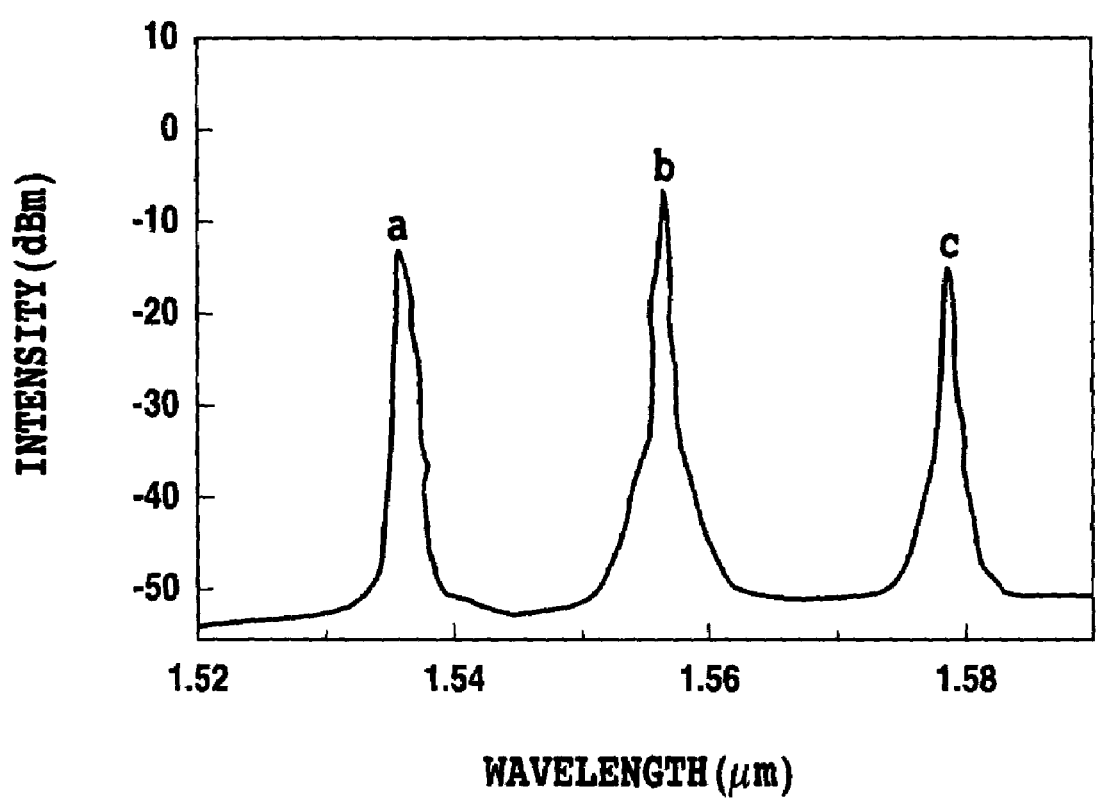
FIG. 12 is a diagram showing a wavelength conversion spectrum in Embodiment 3-4 and Embodiment 4-14.

FIG. 12 shows a spectrum of light after it was wavelength-converted, with [a] representing a signal light, [b] a second-order diffracted light of the pump light and [c] a converted light. As can be seen from FIG. 12, the conversion efficiency was calculated to be about 20 times that of the quasi-phase matching device of LiNbO$_3$. In this wavelength conversion, the light is confined in the diffused core and the nonlinearity coefficient of the core determines the efficiency of the wavelength conversion device. As shown in this embodiment, it is found that the nonlinearity of the KTN waveguide with diffused Li is very high and is not degraded before or after the Li diffusion.

[Embodiment 4]

The present invention is characterized in that β-diketone complex as a starting material of K is used to fabricate a crystal film of KTa$_{1-x}$Nb$_x$O$_3$ (0<x<1) (hereinafter referred to simply as KTN) and that metal β-diketone complexes as starting material of K and Li are used to fabricate crystal films of K$_{1-y}$Li$_y$Ta$_{1-x}$Nb$_x$O$_3$ (0<x<1 and 0<y<1) (referred to simply as KLTN). The β-diketone complex of K and β-diketone complex of Li are defined in general expressions (1) and (2), respectively:

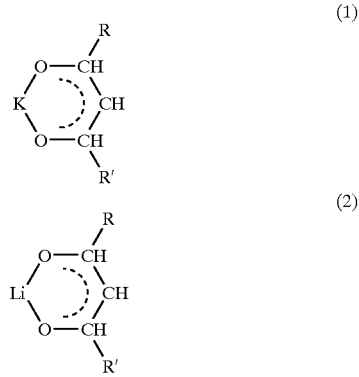

(In the above expressions, R is an alkyl group with a carbon number of between 1 and 7; R' is an alkyl group or C$_n$F$_{2+1}$; and n=1 to 3)

As can be seen from the general expressions (1) and (2), the metal β-diketone complexes have a structure in which an organic substance coordinates with metal ions through oxygen. This structure is stabilized by electrons becoming unlocalized in a six-membered ring consisting of oxygen and carbon including K or Li.

The electron state of the six-membered ring can be controlled by the two kinds of substituents R and R' bonding to carbon elements. These substituents determine a three-dimensional structure, so if they are structured to enclose K or Li, the volatility can be increased. The use of the metal β-diketone complexes can vaporize K or Li at temperatures below 300° C. to secure a vapor pressure necessary for the CVD method.

In this compound, however, the volatilization and decomposition generally conflict with each other, so it is important to properly select the substituents R and R' to improve the stability for decomposition. To secure the stability against decomposition it is desired that the substituents be alkyl groups with a large carbon number. On the other hand, to increase the volatility it is effective to replace hydrogen of the alkyl group with fluorine. In this invention, therefore, when an emphasis is placed on the thermal stability against decomposition, an alkyl group or t-butyl group with a long normal chain is used. When the volatility is emphasized, C$_n$F$_{2n+1}$ is used. In striking a balance between stability and volatility, it is effective to use the alkyl group as one substituent R and the fluorine-replaced alkyl group as the other R'.

More specifically, preferred β-diketone complexes of K include, but not limited to, those complexes having as ligands 2,2-dimethyl-3,5-octanedione, 2,2-dimethyl-6,6,6-trifuoro-3,5-hexanedione, 5,5,5-trifluoro-2,4-pentanedione, 2,2-dimethyl-6,6,7,7,7-pentafluoro-3,5-heptanedione, and 2,2-dimethyl-6,6,7,7,8,8,8-heptanefluoro-3,5-octanedione. Preferred β-diketone complexes of Li include, but not limited to, those complexes with 2,6,6-tetramethyl-3,5-heptanedione as ligands.

The method of manufacturing a KTN crystal film of this invention introduces, as a gas flow into a reaction system, the β-diketone complex of K described above, a gaseous compound and/or a volatile compound of Ta, which is one of metal elements making up the crystal film, a gaseous compound and/or a volatile compound of Nb, and an oxygen-containing gas that works as an oxidizing agent. In this reaction system a substrate is provided and the introduced components are reacted in gas phase or on this substrate to form a KTN crystal film on the substrate.

The method of manufacturing a KLTN crystal film of this invention introduces, as a gas flow into a reaction system, the β-diketone complexes of K and Li described above, a gaseous compound and/or a volatile compound of Ta, which is one of metal elements making up the crystal film, a gaseous compound and/or a volatile compound of Nb, and an oxygen-containing gas that works as an oxidizing agent. This reaction system is provided with a substrate, and the introduced components are reacted in gas phase or on this substrate to form a KLTN crystal film on the substrate.

Among preferred gaseous and/or volatile compounds of Ta used in this invention are alkoxide such as $Ta(OC_2H_5)_5$ and halide $TaCl_5$. Preferred gaseous and/or volatile compounds of Nb include alkoxide such as $Nb(OC_2H_5)_5$ and halide $NbCl_5$.

The oxygen-containing gas is preferably a gas containing oxygen, or a gas containing oxygen and at least one of hydrogen and nitrogen. When fluorinated alkyl is used as a substituent of β-diketone complex of K and/or β-diketone complex of Li, it is preferred that an oxygen-containing gas containing hydrogen be used as a fluorine getter.

Among possible substrates for use in this invention are $SrTiO_3$, $SiO_2$, MgO, $MgAl_2O_4$, $NdGaO_3$, $KTa_{1-x}Nb_xO_3$, $K_{1-y}Li_yTa_{1-x}Nb_xO_3$, and $K_{1-y}Li_yTa_{1-x}Nb_xO_3$. The temperature of the substrate during reaction is preferably in the range of 400–1,200° C. because the KTN or KLTN crystal structure produced in this temperature range is homogeneous.

Further, since the β-diketone complex of K and β-diketone complex of Li have their metal ions already bonded with oxygen, they have an advantage of being able to produce an oxide by thermal decomposition without using an oxidizer. It should be noted, however, that an oxygen-containing gas is preferably introduced for preventing contamination by carbon.

With this method, a fast film deposition rate of 100–150 μm/hour is obtained. The crystal films of $KTa_{1-x}Nb_xO_3$ and/or $K_{1-y}Li_yTa_{1-x}Nb_xO_3$ fabricated in this manner have a nonlinear optical effect and an electrooptical effect and can be used in optical signal processing devices for wavelength conversion, waveform shaping and optical amplification.

[Embodiment 4-1]

Figure 13:
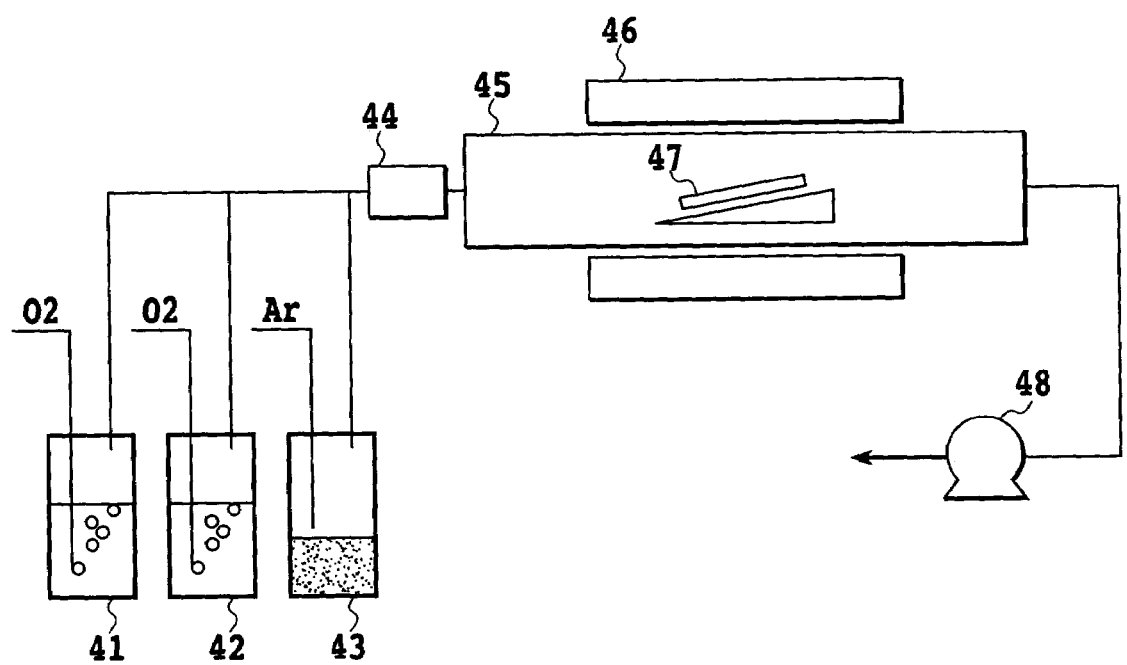
FIG. 13 is a schematic diagram of a film deposition apparatus in Embodiment 4-1.

FIG. 13 is an outline of the CVD apparatus used in this embodiment. The raw material of K used was K(DPM)(2,2,6,6-tetramethyl-3,5-heptanedione complex) which has t-butyl groups as both substituents. The Ta material and Nb material used were $Ta(OC_2H_5)_5$ and $Nb(OC_2H_5)_5$, respectively. K(DPM) is a solid material while $Ta(OC_2H_5)_5$ and $Nb(OC_2H_5)_5$ are liquid materials. These materials were introduced into independently temperature-controlled bubblers, i.e., a Ta material bubbler 41, a Nb material bubbler 42 and a K material bubbler 43, and temperature-controlled by heaters (not shown).

As a material carrier gas, argon was used for K(DPM) and, for other Ta and Nb materials, oxygen was used. The material temperature was set at 200° C. for K(DPM), 142° C. for $Ta(CO_2H_5)_5$ and 145° C. for $Nb(OC_2H_5)_5$. The amount of material supplied was adjusted by the carrier gas flow. The piping temperature was controlled at 205° C. to prevent a possible condensation of the material. After the material gases were mixed in a mixer 44, they were introduced into a reaction tube 45. The pressure in the apparatus was reduced to 1.3 kPa (10 Torr), and the substrate 47 was heated by an external heater (electric furnace) 46 to 600° C., 700° C., 800° C., 900° C., 1,000° C. and 1,100° C. $SrTiO_3$ was used for the substrate. Reference numeral 41 denotes the Ta material bubbler, 42 the Nb material bubbler, 43 the K material bubbler, and 48 a rotary pump.

The carrier gas was controlled so that the composition of the crystal was $KTa_{0.65}Nb_{0.35}O_3$. The films were deposited to a thickness of 2.0 μm. The crystal films formed at different temperatures described above were observed by a SEM and their crystal phases were identified by the X-ray diffraction. The light transmission losses at the wavelength of 1.55 μm were measured by the prism coupling, and the homogeneity of each crystal film was measured by measuring the strength distribution of a second harmonic generation. The measurement results are shown in Table 1.

TABLE 1

| Substrate temperature (° C.) | Deposition rate (μm/min) | Crystal state | Average grain dia. (μm) | Light transmission loss (dB/cm) | Homogeneity |
| --- | --- | --- | --- | --- | --- |
| 600 | 0.3 | Amorphous | — | 0.08 | Excellent |
| *600 | — | Polycrystalline | 7 | 0.1 | Excellent |
| 700 | 0.5 | Polycrystalline | 10 | 0.1 | Excellent |
| 800 | 0.9 | Polycrystalline | 15 | 0.1 | Excellent |
| 900 | 1.5 | Polycrystalline | 25 | 0.1 | Excellent |
| 1,000 | 2.5 | Single crystal | — | 0.1 | Excellent |
| 1,100 | 5.0 | Single crystal | — | 0.1 | Excellent |

*600: After the film was formed at 600° C., it was heat-treated for two hours at 1,000° C. in the air.

The KTN film fabricated at a substrate temperature of 600° C. was checked by the X-ray diffraction and found to be amorphous. Its light transmission loss was 0.08 dB/cm, which is sufficiently low for a waveguide film. The deposition rate was 0.3 μm/min.

This film was heat-treated for two hours at 1,000° C. in the air for crystallization to produce a polycrystalline film. The X-ray diffraction showed that after two hours of heat treatment at 1,000° C. in the atmosphere, the film was oriented in the direction of the substrate $SrTiO_3$. The SEM observation found that the average grain diameter was 7 μm. The light transmission loss of this film was 0.1 dB/cm and there was no significant increase in the scattering loss due to crystallization. Even with an incident He-Ne laser beam, no light scattering was observed at grain boundaries.

When the substrate temperature was set at 700° C., 800° C. and 900° C., polycrystalline films oriented in the direction of the substrate were obtained. The deposition rates at these temperatures were 0.5 μm/min. 0.9 μm/min and 1.5 μm/min, respectively. It is found that the grain diameter of the crystal film increases with the temperature. At the temperature of 900° C. the average grain diameter reached 25 μm. The light transmission losses of these polycrystalline films were around 0.1 dB/cm and the films were optically homogeneous.

For the substrate temperature of 1,000° C., the SEM observation and the X-ray diffraction analysis found that a single crystal was obtained. The optical characteristic of this film was almost identical with that of the polycrystalline films but with a slightly lower scattering loss.

Figure 14:
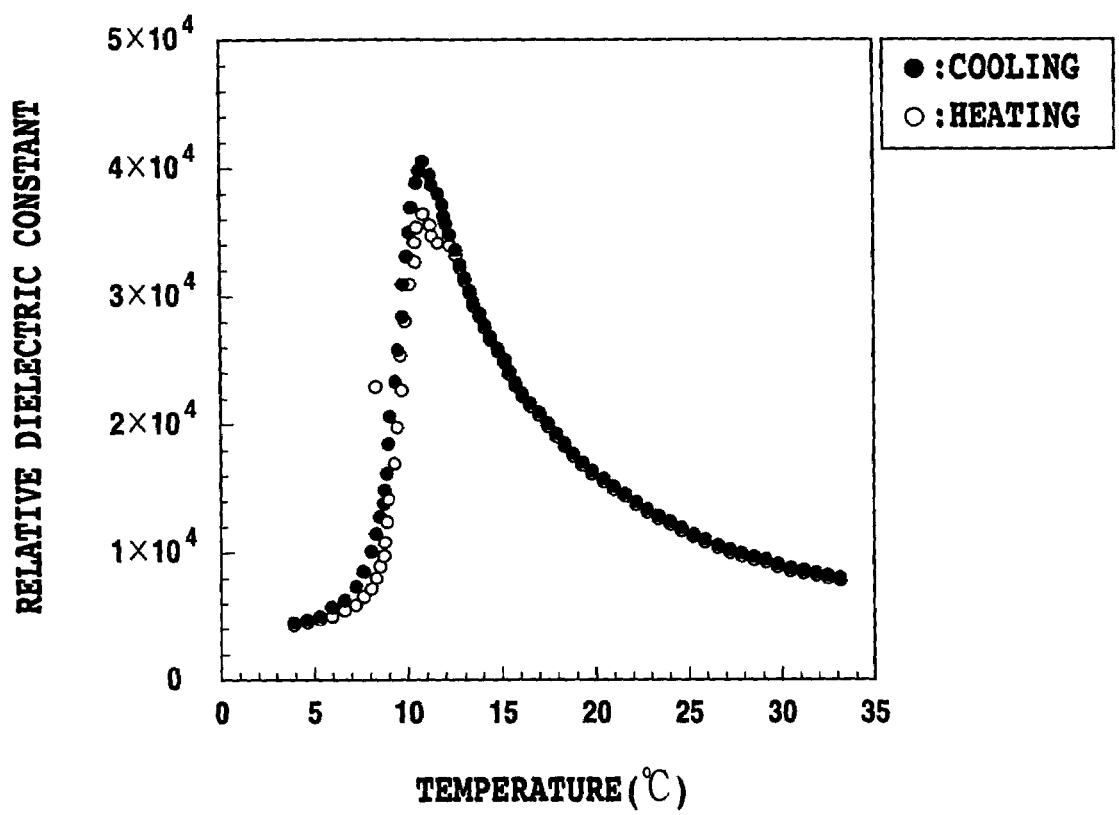
FIG. 14 is a graph showing a measurement result of a dielectric constant of a KTN film fabricated in Embodiment 4-1.

FIG. 14 is a graph showing a temperature-dependency of dielectric constant of the crystal grown at the substrate temperature of 1,000° C. It is seen from this graph that the dielectric constant at around the phase transition temperature reaches as high as 30,000 and that this film is homogeneous and exhibits nearly the same characteristics as those of the bulk single crystals.

For the substrate temperature of 1,100° C., a single crystal film was able to be formed. But the volatilization of $K_2O$ was remarkable and thus it was necessary to increase the amount of supply of K(DPM).

[Embodiment 4-2 to 4-7]

Crystal films were formed at predetermined temperatures (600, 700, 800, 900, 1,000 and 1,100° C.) in a manner similar to Embodiment 4-1, except that the following materials were used for the substrate instead of $SrTiO_3$ used in Embodiment 4-1: $SiO_2$ (Embodiment 4-2), MgO (Embodiment 4-3), $MgAl_2O_4$ (Embodiment 4-4), $NdGaO_3$ (Embodiment 4-5), $KTa_{1-x}Nb_xO_3$ and $K_{1-y}Li_yTa_{1-x}Nb_xO_3$ (Embodiment 4-6), and $K_{1-y}Li_yTa_{1-x}Nb_xO_3$ (Embodiment 4-7).

The crystal films thus formed were subjected to examinations similar to those of Embodiment 4-1, i.e., identification of crystal phase and measurement of crystal grain diameter, light transmission loss and homogeneity. The results of examinations are similar to those of Embodiment 4-1 and shown in Table 2 (Embodiment 4-2), Table 3 (Embodiment 4-3), Table 4 (Embodiment 4-4), Table 5 (Embodiment 4-5), Table 6 (Embodiment 4-6), and Table 7 (Embodiment 4-7).

TABLE 2

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.3 | Amorphous | — | 0.09 | Excellent |
| 700 | 0.5 | Amorphous | — | 0.08 | Excellent |
| 800 | 1.0 | Amorphous | — | 0.08 | Excellent |
| 900 | 1.5 | Amorphous | — | 0.09 | Excellent |
| 1,000 | 2.6 | Polycrystalline | 5 | 0.12 | Excellent |
| 1,100 | 5.1 | Polycrystalline | 10 | 0.11 | Good |

TABLE 3

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.3 | Amorphous | — | 0.09 | Excellent |
| 700 | 0.5 | Polycrystalline | 5 | 0.12 | Excellent |
| 800 | 1.0 | Polycrystalline | 7 | 0.13 | Excellent |
| 900 | 1.5 | Polycrystalline | 10 | 0.12 | Excellent |
| 1,000 | 2.6 | Single crystal | — | 0.12 | Excellent |
| 1,100 | 5.0 | Single crystal | — | 0.11 | Good |

TABLE 4

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.3 | Amorphous | — | 0.09 | Excellent |
| 700 | 0.5 | Polycrystalline | 5 | 0.10 | Excellent |
| 800 | 1.0 | Polycrystalline | 7 | 0.11 | Excellent |
| 900 | 1.5 | Single crystal | — | 0.10 | Excellent |
| 1,000 | 2.5 | Single crystal | — | 0.10 | Excellent |
| 1,100 | 5.0 | Single crystal | — | 0.09 | Excellent |

TABLE 5

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.3 | Amorphous | — | 0.08 | Excellent |
| 700 | 0.5 | Polycrystalline | 6 | 0.11 | Excellent |
| 800 | 1.1 | Polycrystalline | 8 | 0.11 | Excellent |

TABLE 5-continued

| Substrate temperature (° C.) | Deposition rate (μm/min) | Crystal state | Average grain dia. (μm) | Light transmission loss (dB/cm) | Homogeneity |
|---|---|---|---|---|---|
| 900 | 1.5 | Polycrystalline | 15 | 0.10 | Excellent |
| 1,000 | 2.6 | Single crystal | — | 0.10 | Excellent |
| 1,100 | 5.1 | Single crystal | — | 0.09 | Excellent |

TABLE 6

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.3 | Amorphous | — | 0.08 | Excellent |
| 700 | 0.6 | Polycrystalline | 7 | 0.11 | Excellent |
| 800 | 1.1 | Polycrystalline | 10 | 0.10 | Excellent |
| 900 | 1.5 | Single crystal | — | 0.10 | Excellent |
| 1,000 | 2.6 | Single crystal | — | 0.10 | Excellent |
| 1,100 | 5.2 | Single crystal | — | 0.09 | Excellent |

TABLE 7

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.3 | Amorphous | — | 0.08 | Excellent |
| 700 | 0.5 | Polycrystalline | 6 | 0.10 | Excellent |
| 800 | 1.1 | Polycrystalline | 9 | 0.10 | Excellent |
| 900 | 1.5 | Single crystal | — | 0.10 | Excellent |
| 1,000 | 2.6 | Single crystal | — | 0.10 | Excellent |
| 1,100 | 5.0 | Single crystal | — | 0.10 | Excellent |

[Embodiment 4-8 to 4-12]

Crystal films were formed at predetermined temperatures (600, 700, 800, 900, 1,000 and 1,100° C.) in a manner similar to Embodiment 4-1, except that the ligands of the β-diketone complex as the K material were 2,2-dimethyl-3,5-octanedione (Embodiment 4-8), 2,2-dimethyl-6,6,6-trifluoro-3,5-hexandione (Embodiment 4-9), 5,5,5-trifluoro-2,4-pentanedione (Embodiment 4-10), 2,2-dimethyl-6,6,7,7,7-pentafluoro- 3,5-heptanedione (Embodiment 4-11), 2,2-dimethyl-6,6,7,7,8,8,8-heptanefluoro-3,5-octanedione (Embodiment 4-12).

The crystal films thus formed were subjected to examinations similar to those of Embodiment 4-1, i.e., identification of crystal phase and measurement of crystal grain diameter, light transmission loss and homogeneity. In these Embodiments 4-8 to 4-12, the crystal films obtained have characteristics similar to those of Embodiment 4-1. When a material containing fluorine was used (Embodiments 4-9, 4-10, 4-11, 4-12), there was a decrease in the deposition rate. However, introducing $H_2O$ into the reaction system prevented the deposition rate reduction.

The results of measurements are shown in Table 8 (Embodiment 4-8), Table 9 (Embodiment 4-9), Table 10 (Embodiment 4-10), Table 11 (Embodiment 4-11), and Table 12 (Embodiment 4-12).

TABLE 8

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.3 | Amorphous | — | 0.08 | Excellent |
| 700 | 0.5 | Polycrystalline | 10 | 0.10 | Excellent |
| 800 | 1.0 | Polycrystalline | 15 | 0.10 | Excellent |
| 900 | 1.5 | Polycrystalline | — | 0.10 | Excellent |
| 1,000 | 2.5 | Single crystal | — | 0.10 | Excellent |
| 1,100 | 5.0 | Single crystal | — | 0.09 | Excellent |

TABLE 9

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.15 | Amorphous | — | 0.08 | Excellent |
| 700 | 0.25 | Polycrystalline | 12 | 0.10 | Excellent |
| 800 | 0.5 | Polycrystalline | 17 | 0.10 | Excellent |
| 900 | 0.7 | Polycrystalline | — | 0.10 | Excellent |
| 1,000 | 1.2 | Single crystal | — | 0.10 | Excellent |
| 1,100 | 2.3 | Single crystal | — | 0.09 | Excellent |

TABLE 10

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.12 | Amorphous | — | 0.08 | Excellent |
| 700 | 0.25 | Polycrystalline | 13 | 0.10 | Excellent |
| 800 | 0.4 | Polycrystalline | 17 | 0.10 | Excellent |
| 900 | 0.6 | Polycrystalline | — | 0.10 | Excellent |
| 1,000 | 1.2 | Single crystal | — | 0.10 | Excellent |
| 1,100 | 2.2 | Single crystal | — | 0.09 | Excellent |

TABLE 11

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.11 | Amorphous | — | 0.08 | Excellent |
| 700 | 0.21 | Polycrystalline | 13 | 0.10 | Excellent |
| 800 | 0.39 | Polycrystalline | 19 | 0.10 | Excellent |
| 900 | 0.8 | Polycrystalline | — | 0.10 | Excellent |
| 1,000 | 1.2 | Single crystal | — | 0.10 | Excellent |
| 1,100 | 2.3 | Single crystal | — | 0.09 | Excellent |

TABLE 12

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.11 | Amorphous | — | 0.08 | Excellent |
| 700 | 0.2 | Polycrystalline | 12 | 0.10 | Excellent |
| 800 | 0.35 | Polycrystalline | 19 | 0.10 | Excellent |
| 900 | 0.8 | Polycrystalline | — | 0.10 | Excellent |
| 1,000 | 1.3 | Single crystal | — | 0.10 | Excellent |
| 1,100 | 2.5 | Single crystal | — | 0.09 | Excellent |

[Embodiment 4-13]

Crystal films were fabricated at predetermined temperatures (600, 700, 800, 900, 1,000 and 1,100° C.) in a manner similar to Embodiment 4-1, except that Li(DPM) was used in addition to K(DPM) as the initial material and that $TaCl_5$ and $NbCl_5$ were also used. The compositions of these films thus formed were $K_{0.9}Li_{0.1}Ta_{0.65}Nb_{0.35}O_3$. These crystal films were subjected to examinations similar to those of Embodiment 4-1, i.e., identification of crystal phase and measurement of crystal grain diameter, light transmission loss and homogeneity. The results of measurements are shown in Table 13.

TABLE 13

| Substrate temperature (° C.) | Deposition rate (μm/min) | Crystal state | Average grain dia. (μm) | Light transmission loss (dB/cm) | Homogeneity |
|---|---|---|---|---|---|
| 600 | 0.28 | Amorphous | — | 0.08 | Excellent |
| 700 | 0.48 | Polycrystalline | 12 | 0.10 | Excellent |
| 800 | 0.85 | Polycrystalline | 19 | 0.10 | Excellent |
| 900 | 1.2 | Polycrystalline | — | 0.10 | Excellent |

TABLE 13-continued

| Substrate temperature (° C.) | Deposition rate (μm/min) | Crystal state | Average grain dia. (μm) | Light transmission loss (dB/cm) | Homogeneity |
|---|---|---|---|---|---|
| 1,000 | 2.2 | Single crystal | — | 0.10 | Excellent |
| 1,100 | 3.8 | Single crystal | — | 0.09 | Excellent |

The measurement result indicates that the crystal films have crystal states and transparent characteristics almost similar to those of Embodiment 4-1 and that this method can produce a high quality KLTN crystal.

Figure 15:
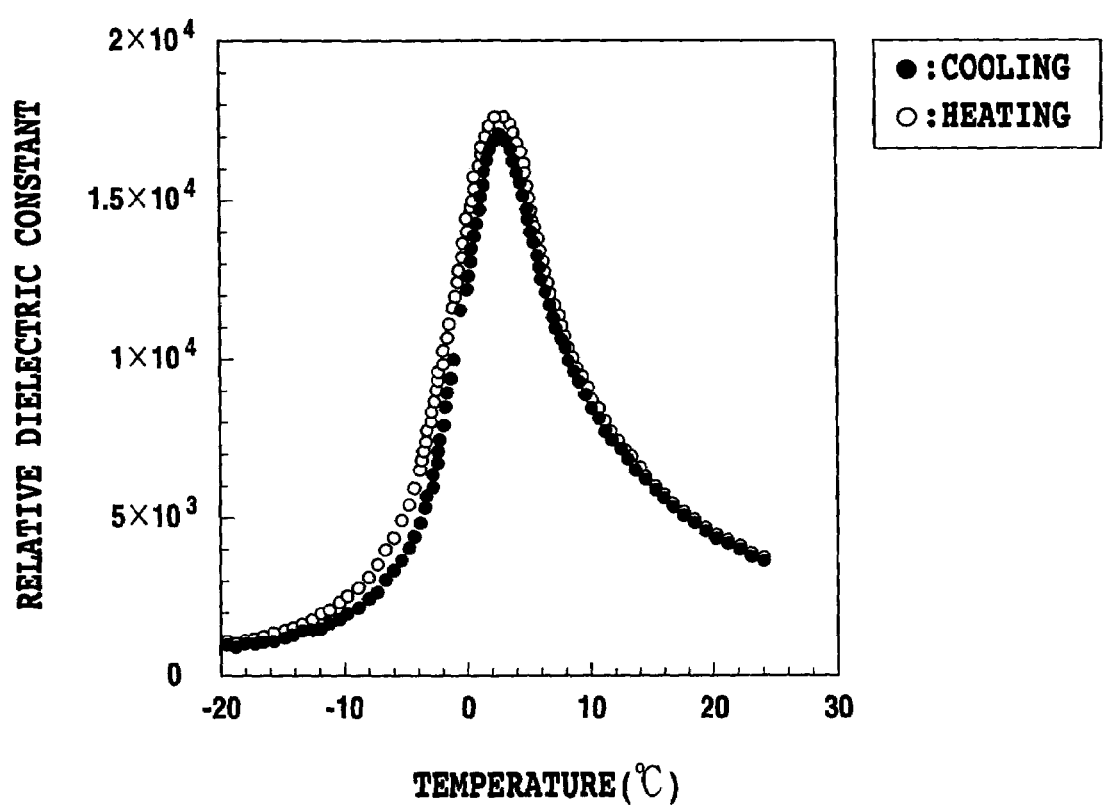
FIG. 15 is a graph showing a measurement result of a dielectric constant of a KLTN film fabricated in Embodiment 4-13.

FIG. 15 shows a temperature-dependency of dielectric constant of the crystal film formed at 1,000° C. From the measurement of dielectric constant it is evident that a homogeneous film was produced.

[Embodiment 4-14]

Figure 16A:
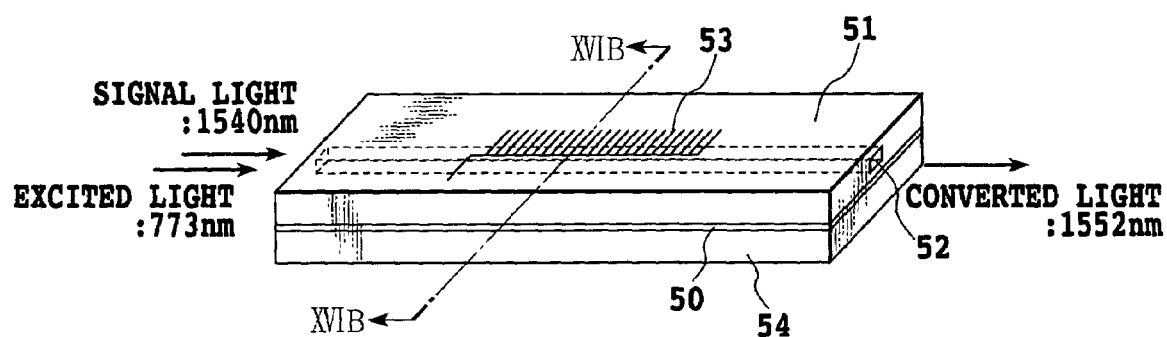
FIG. 16A is a perspective view of a wavelength conversion device fabricated in Embodiment 4-14.
Figure 16B:
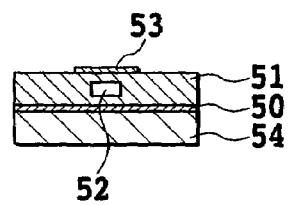
FIG. 16B is a cross-sectional view of the wavelength conversion device taken along the line XVIB—XVIB of FIG. 16A.

FIG. 16A and FIG. 16B illustrate a fabrication of a wavelength conversion device manufactured in this embodiment. FIG. 16A is a perspective view of the wavelength conversion device and FIG. 16B is a cross-sectional view taken along the line XVIB—XVIB of FIG. 16A.

A SiO$_2$ substrate 54 with a lower electrode 50 of Au formed by evaporation was heated to 900° C. and deposited with a KTN crystal film to a thickness of 5 μm in a manner similar to that of Embodiment 4-1. On the KTN crystal film a KLTN crystal film was formed to a thickness of 0.4 μm by the method of embodiment 4-2. Both of the crystal films were polycrystalline with a grain diameter of 15 μm. The KLTN crystal film was processed by photolithography into a ridge waveguide 52 0.4 μm wide. Then, a KTN crystal film was formed over the entire surface of the substrate by the method of Embodiment 4-1. This KTN crystal film was grown over the KLTN crystal film to a thickness of 3 μm. In this way, a KLTN crystal film waveguide enclosed by the KTN crystal film 51 was obtained.

The relative index difference of the manufactured waveguide is 2.5% and the cutoff wavelength is 0.6 μm. For longer wavelengths the waveguide functions as a single-mode waveguide. The length of the waveguide fabricated was 3 cm and the light transmission loss of the waveguide 0.15 dB/cm.

An upper electrode 53 was formed over the KTN crystal film by evaporating gold. An electrode pitch corresponds to a grating pitch that realizes a quasi-phase matching required to perform a wavelength conversion on a 1.55 μm band with a 0.773 μm light used as a pump light. In this case, the electrode pitch is 12 μm. Hence, this waveguide functions as a wavelength conversion device.

In this way, a wavelength conversion device with electrodes as shown in FIG. 16 was fabricated. A voltage corresponding to 1 kV/cm was applied to the electrode; using polarization maintaining fibers, a signal light of 1.54 μm and a pump light of 0.773 μm were simultaneously launched into the device; and an output light was measured using an optical spectrum analyzer.

FIG. 12 shows a spectrum of light after it was wavelength-converted. In the figure, [a] represents the wavelength of a signal light, [b] the wavelength of a second-order diffracted light of the pump light and [c] the wavelength of a converted light. FIG. 12 clearly indicates that the wavelength conversion is realized by the differential frequency generation. Further, the signal light and the converted light were parametric-amplified and the gain of the converted light with respect to the input signal light reaches as high as about 15 dB, which cannot be realized with the conventional LN wavelength conversion devices. As can be seen from this diagram, the method of this invention makes it possible to arrange in layer functional KTN or KTLN waveguides on a SiO$_2$ substrate.

[Embodiment 4-15]

A wavelength conversion device was manufactured in a way similar to that of Embodiment 4-14, except that the substrate temperature was set at 1,000° C. Although the crystal formed was a single crystal as the substrate temperature was changed, characteristics obtained were similar to those of Embodiment 4-14.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A method of manufacturing an optical waveguide, wherein the optical waveguide comprises an undercladding layer, a waveguide layer formed on the undercladding layer and having a higher refractive index than that of the undercladding layer, and an overcladding layer covering the waveguide layer and having a lower refractive index than that of the waveguide layer, the method comprising steps of: using the undercladding layer as a substrate and forming on the substrate a crystal growth nucleation position,
wherein the crystal growth nucleation position comprises a groove or hole formed in the substrate or a groove or hole formed in an electrode layer provided on the substrate; and
growing a thin film of an optical functional material KTa$_x$Nb$_{1-x}$O$_3$ (0<x<1) into a rectangular parallelepiped with the structure as a center to form the waveguide layer.

2. A method of manufacturing an optical waveguide as claimed in claim 1, wherein the waveguide layer is grown by a liquid phase epitaxy.

3. A method of manufacturing an optical waveguide, wherein the optical waveguide comprises an undercladding layer, a waveguide layer formed on the undercladding layer and having a higher refractive index than that of the undercladding layer, and an overcladding layer covering the waveguide layer and having a lower refractive index than that of the waveguide layer, the method comprising the steps of: using the undercladding layer as a substrate and forming on the substrate a structure constituting a crystal growth nucleation position; and growing a thin film of an optical functional material K$_{1-y}$Li$_y$Ta$_x$Nb$_{1-x}$O$_3$ (0<x<1, 0<y≦0.5) into a rectangular parallelepiped with the structure as a center to form the waveguide layer.

4. A method of manufacturing an optical waveguide as claimed in claim 3, wherein the structure constituting the crystal growth nucleation position is a groove or hole formed in the substrate or a groove or hole formed in an electrode layer provided on the substrate.

5. A method of manufacturing an optical waveguide as claimed in claim 3, wherein the waveguide layer is grown by a liquid phase epitaxy.

* * * * *